United States Patent [19]
Kawai

[11] Patent Number: 5,792,597
[45] Date of Patent: *Aug. 11, 1998

[54] IMAGE FORMING METHOD

[75] Inventor: Kiyoshi Kawai, Kanagawa, Japan

[73] Assignee: Fuji Photo Film Co., Ltd., Kanagawa, Japan

[*] Notice: The portion of the term of this patent subsequent to Oct. 13, 2009, has been disclaimed.

[21] Appl. No.: 236,161

[22] Filed: May 2, 1994

Related U.S. Application Data

[63] Continuation of Ser. No. 842,651, Feb. 27, 1992, abandoned.

[30] Foreign Application Priority Data

Feb. 28, 1991 [JP] Japan ............... HEI3-55636

[51] Int. Cl.⁶ ............................................. G03B 27/72
[52] U.S. Cl. .............. 430/363; 430/509; 430/944; 430/945; 430/434; 430/567
[58] Field of Search ..................... 430/363, 434, 430/509, 562, 963, 944, 945

[56] References Cited

U.S. PATENT DOCUMENTS

| | | | |
|---|---|---|---|
| 3,955,983 | 5/1976 | Nakajima et al. | 430/363 |
| 4,770,978 | 9/1988 | Matsuzaka et al. | 430/363 |
| 4,828,962 | 5/1989 | Grzeskewiak | 430/608 |
| 4,920,040 | 4/1990 | Ono | 430/363 |
| 4,943,517 | 7/1990 | Powers et al. | 430/944 |
| 4,956,702 | 9/1990 | McQuade et al. | 430/944 |
| 5,034,308 | 7/1991 | Abe et al. | 430/372 |
| 5,051,341 | 9/1991 | Muenter et al. | 430/363 |
| 5,057,405 | 10/1991 | Shiba et al. | 430/567 |
| 5,063,146 | 11/1991 | Inagaki et al. | 430/944 |
| 5,126,235 | 6/1992 | Hioki | 430/944 |
| 5,153,110 | 10/1992 | Kawai et al. | 430/363 |
| 5,154,995 | 10/1992 | Kawai | 430/944 |
| 5,176,987 | 1/1993 | Nakamura et al. | 430/963 |
| 5,185,236 | 2/1993 | Shiba et al. | 430/363 |
| 5,350,665 | 9/1994 | Hasebe et al. | 430/605 |

FOREIGN PATENT DOCUMENTS 2157749  6/1990  Japan ................. 430/363

OTHER PUBLICATIONS

T.H. James, "The Theory of the Photographic Process" © 1977, pp. 501-510 and 566 Research Disclosure (Dec. 1989) pp. 993-1015.

*Primary Examiner*—Martin Angebranndt
*Attorney, Agent, or Firm*—Sughrue, Mion, Zinn, Macpeak & Seas, PLLC

[57] ABSTRACT

In the improved image forming method, a silver halide photographic material whose characteristic curve passes below the line connecting three points A ($logE_{max}-1.55$, fog+0.05), B ($logE_{max}-1.10$, fog+0.25) and C ($logE_{max}-0.95$, fog+0.50) on a coordinate system ($E_{max}$ is a maximum quantity of light) and passes above point P ($logE_{max}$, fog+1.70) is subjected to digital exposure and thereafter processed photographically to form an image. This method is capable of forming an image of good gradation having no density skips in the highlighted area.

10 Claims, 6 Drawing Sheets

IMAGE FORMING METHOD

This is a continuation of application Ser. No. 07/842,651 filed Feb. 27, 1992 (abandoned).

BACKGROUND OF THE INVENTION

This invention relates to a method of forming image on silver halide photographic materials by digital exposure with a suitable light source such as a semiconductor laser. More particularly, this invention relates to a method of forming positive image from either negative or positive image information.

Conventional analog exposure of light-sensitive materials by light either reflected from or transmitted through the original is increasingly supplanted by a new technique called "digital exposure" which has such advantages as high image quality and ease of image processing. In the digital method, exposure is performed with the quantity of light being varied stepwise in response to a digital signal as produced by discrete coding of image density information. Since image processing on the basis of pixels can be easily performed in digital exposure, this method allows special processing operations such as edge enhancement to be accomplished easily. Digital exposure of light-sensitive materials with a semiconductor laser can be accomplished in one of two ways: 1) intensity modulation in which the intensity of laser light is modulated in accordance with the image density; or 2) time duration (pulse width) modulation in which the period of light emission is modulated in accordance with the image density. In the first method, the current being applied to the semiconductor laser is adjusted so that the output laser light per unit time is properly controlled to change the amount of exposure, thereby forming a multilevel image. In the second method, the duration of current impression on the semiconductor laser is varied so that the laser output time is adjusted to change the amount of exposure, thereby forming a multi-level image.

The relationship between the amount of exposure and image density of a light-sensitive material is generally such that the density is substantially proportional to the change in the logarithm of exposure. Hence, a characteristic curve for the relationship between the exposure and density of a light-sensitive material can be constructed by changing the exposure logarithmically while changing the density anti-logarithmically. Thus, in order to adjust the exposure as appropriate for a specific density, one may change the quantity of light logarithmically and, to this end, one may change logarithmically the value of a control signal for setting the intensity or time duration. However, it is extremely difficult to design a control circuit capable of such adjustments and a more common practice is such that the value to be controlled is varied antilogarithmically by equal differences. For example, in the case of performing modulation control with a microcomputer, the modulation control signals produced are as many as the possible combinations of bits in one byte and the output (light) for successive modulation control signals varies by a constant amount.

FIG. 6 is a graph showing the relationship between modulation control signal S, light quantity logE and density D for a negative-acting light-sensitive material (e.g. a color print paper) on which a positive image is to be formed from image information. As is clear from FIG. 6, the change in the logarithm of light quantity ($\Delta$logE) in response to the change in the modulation control signal ($\Delta$S) and, hence, the density difference ($\Delta D_1$) is small in the area with much light (i.e., the area of high image density); however, in the area with less light (i.e., the highlighted area of low image density), a change in the modulation control signal by the same amount ($\Delta$S) will cause a great change in the logarithm of light quantity ($\Delta$logE), resulting in an extremely great density difference ($\Delta D_2$). As a result, density differences (density skips) $\Delta D_2$ that exceed the visibility limit will occur in the highlighted area and the failure to achieve satisfactory gradation will unavoidably result in lower tone reproduction. Take, for example, a picture of a human subject. The image of his face is often in the highlighted area and if density skips of the kind described above occur, the light and dark areas of the face cannot be faithfully reproduced and the quality of the image obtained is very low.

In the conventional method of image recording by digital exposure, a positive image is formed on a positive-acting light-sensitive material from image information and, contrary to the negative-acting light-sensitive material, the change in the logarithm of light quantity ($\Delta$logE) in response to the change in the modulation control signal ($\Delta$S) and, hence, the density difference ($\Delta D_1$) is small in the area with much light (i.e., the highlighted area of low image density) and there has been no problem associated with the visibility limit. In the area with less light (i.e., the area of high image density), a change in the modulation control signal by the same amount ($\Delta$S) will cause a great change in the logarithm of light quantity ($\Delta$logE), again resulting in an extremely great density difference ($\Delta D_2$). However, the area of high image density is virtually free from the visibility limit problem which would other wise occur in the highlighted area.

Hence, the occurrence of the visibility problem in image recording by the digital exposure method is a phenomenon peculiar to the formation of a positive image on negative-acting light-sensitive materials (e.g. color print papers) from image information.

Of the two method of implementing digital exposure, the intensity modulation approach has the problem that the accuracy of exposure is not insured since the light source is subject to thermal hysteresis which, in turn, will affect the optical output. For instance, if outputting of large quantity of light is followed by that of light in a small quantity, the heat generated during the outputting of light in a large quantity affects the light source during the outputting of light in a small quantity and the resulting change in the light quantity will prevent correct exposure under the light of low output.

SUMMARY OF THE INVENTION

The present invention has been accomplished under these circumstances and has as an object providing an image forming method that is capable of producing satisfactory gradation in highlighted areas when digital exposure is performed with a suitable light source such as laser light.

This object of the present invention can be attained by an image forming method characterized in that a silver halide photographic material whose density vs light quantity characteristic curve as obtained by photographic processing after exposure passes below the line connecting three points A (logE$_{max}$−1.55, fog+0.05), B (logE$_{max}$−1.10, fog+0.25) and C (logE$_{max}$−0.95, fog+0.50) on a coordinate system (E$_{max}$ is a maximum quantity of light to be controlled) and passes above point P (logE$_{max}$, fog+1.70) corresponding to the density (fog+1.70) at a maximum quantity of light beam is exposed by scanning for a time period of no more than $10^{-6}$ sec per pixel with a light beam the quantity of which is varied stepwise in response to a modulation control signal corresponding to image density and is thereafter processed photographically to form an image.

DETAILED DESCRIPTION OF THE INVENTION

Figure 1:
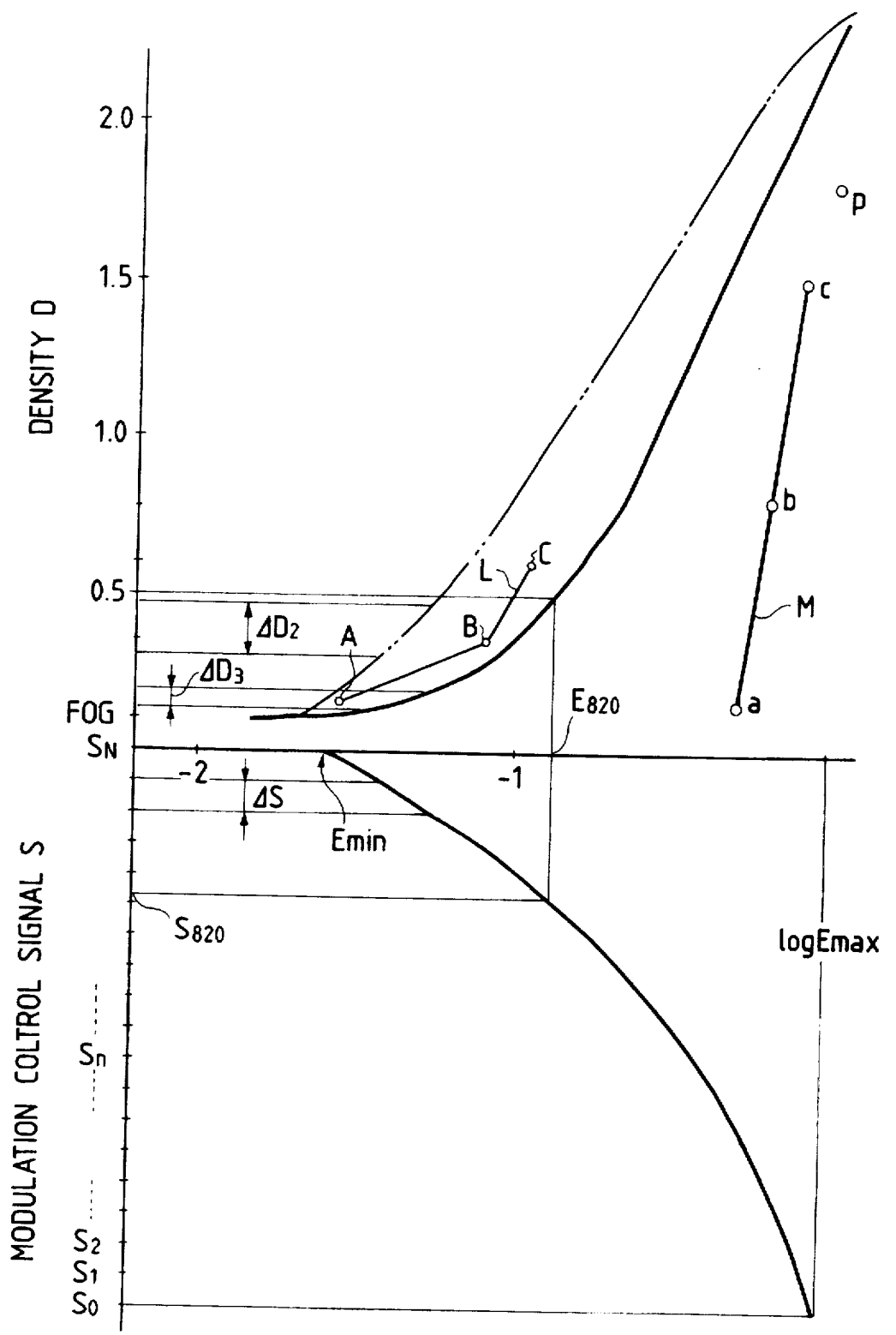
FIG. 1 is a graph showing the relationship between a modulation control signal, the quantity of light and image density as the essential feature of the present invention.

The region of the characteristic curve which lies below the line connecting points A, B and C (this line is hereunder referred to as the "upper reference line") is where the image density is in most cases below 0.5. The region where the image density is less than 0.5 corresponds to the highlighted area and density skips in this region will cause a substantial drop in image quality. According to the experiments conducted by the present inventors, if a light-sensitive material whose characteristic curve as obtained by digital exposure and subsequent photographic processing with a processor passes below the above-defined upper reference line and above point P is subjected to digital exposure, extremely good tone reproduction can be achieved in the highlighted area of the light-sensitive material. In this area, a density change that occurs in response to a change in the quantity of light due to a change in control signal can be reduced to levels below the visibility limit and, hence, there are no density skips and a satisfactory multi-level image can be reproduced.

If the gamma in the highlighted area is too low, the gamma in the process towards point P ($logE_{max}$, fog+1.70) will increase, potentially causing density skips even in the high-density area. To avoid this possibility, the characteristic curve preferably passes above the line connecting three points a ($logE_{max}$−0.3, fog+0.05), b ($logE_{max}$−0.2, fog+0.7) and c ($logE_{max}$−0.1, fog+1.4) (this line is hereunder referred to as the "lower reference line"). In areas of higher density than the highlighted area, the gamma of the characteristic curve under discussion is not limited to any particular value but preferably the gamma in this area is not unduly high, with values of 3.5 and below being particularly preferred. If the gamma is 3.5 and below, variations in image quality due to fluctuations in various factors (e.g. temperature, humidity and electric potential) of the image forming system can be reduced.

When performing exposure by scanning a light beam with its quantity being controlled at multiple levels, the exposure time per pixel must be controlled to be within a very short period of no more than $10^{-6}$ sec and this is necessary for the especial purpose of achieving rapid image formation. In order to control the quantity of light within such a short period of time, establishing a proportional relationship between control signal S and light quantity E is preferred from the viewpoints of easy design, cost and process stability.

If this method is used to control the quantity of light over a dynamic range of about 1.6, the latitude in control is increased in the range of small light quantity, thereby permitting a greater change in density upon exposure of silver halide photographic materials. Since this change in density is particularly pronounced in the low-density area of light-sensitive materials (i.e., the area with densities less than 0.5), it is necessary to design their sensitivity and gradation in such a way that the change in the density of that area is the least pronounced. The present inventors have found that image in which such density skips are adequately suppressed can be obtained by setting such a sensitivity and gradation that the characteristic curve passes below the above-defined upper reference line. In some recent models, the quantity of light can be controlled over a dynamic range of about 2.0 and, even in this case, the present invention enables satisfactory tone reproduction in the highlighted area of light-sensitive materials.

FIG. 1 is a graph showing the relation between the modulation control signal S for driving a laser, the amount of exposure E of a light-sensitive material with the modulated laser, and the image density D obtained by exposure and subsequent processing.

If a maximum quantity of light that is obtained by driving the laser with the modulation control signal S is written as $E_{max}$, the following four points, A ($logE_{max}$−1.55, fog+0.05), B ($logE_{max}$−1.10, fog+0.25), C ($logE_{max}$−0.95, fog+0.50) and P ($logE_{max}$, fog+1.70), are represented as shown in FIG. 1. Those points were determined on an experimental basis but if the light-sensitive material processed is such that the characteristic curve in the highlighted area lies below the line connecting those points, satisfactory tone reproduction can be achieved in the highlighted area.

In a certain case of digital exposure, the quantity of light varies antilogarithmically in response to modulation control signals applied to light source and the logarithm of the light quantity varies by a great amount in the highlighted area. In accordance with the present invention, exposure is performed on a light-sensitive material whose characteristic curve passes below the upper reference line connecting points A, B and C in the highlighted area and, therefore, even in digital exposure of the type described above, only a small change occurs in density in response to the change in the logarithm of the quantity of light. As a result, an image of good gradation can be formed without allowing the density differences in the highlighted area to exceed the visibility limit.

The method of the present invention is equally effective irrespective of whether the laser is driven by intensity modulation or time duration modulation but it is particularly preferred for the case where exposure is performed by modulation of the time duration. The method of "time duration modulation" as adopted in the present invention is such that the duration of laser output is varied by controlling the time for which current is applied to the laser and the time period of current impression is generally set by the pulse width of the drive signal.

By adopting the above-described method, that is, by insuring that at least part of a light-sensitive material having the characteristics defined above is subjected to digital exposure with a laser being driven by time duration modulation control, the tone reproduction in the highlighted area is improved. It should be noted here that the method of controlling the quantity of light for attaining densities exceeding 0.5 is by no means limited to time duration modulation control. Exemplary lasers that can be used as light sources include a semiconductor laser and a gas laser.

In the present invention, it is necessary that image be formed by performing exposure very briefly for a period not longer than $10^{-6}$ sec per pixel. In the practice of such exposure to light of high intensity for a short time, silver halide photographic materials will usually experience "high intensity reciprocity law failure" where the contrast is very low ("soft") or a lower maximum density will occur. Further, a "high AgCl emulsion", or an emulsion of high AgCl content, is preferably used in the present invention for rapid processing and the problem of "high intensity reciprocity law failure" will usually become pronounced with this "high AgCl emulsion". Therefore, it is essential to design a light-sensitive material that is less subject to "high intensity reciprocity law failure" and which hence is expected to have the gradation desired for the present invention.

The emulsion that is suitable for use in achieving the objects of the present invention is described below.

The silver halide emulsion to be used in the present invention is preferably made of a silver chlorobromide or silver chloride that are substantially free from silver iodide. The term "substantially free from silver iodide" means that silver iodide is contained in an amount of no more than 1 mol %, preferably no more than 0.2 mol %. The halide composition of the emulsion may be the same or different among grains and using an emulsion having the same halide composition among grains has the advantage that individual grains can be easily provided with even properties.

The silver halide emulsion grains may have various distributions of halide composition and suitable silver halide grains may be selected from among the following: grains of a "homogeneous" structure having the same composition in every part of the interior; grains of a "layered" structure having different halide compositions between the core and the surrounding shell (which may consist of one or more layers); and grains of such a structure that a part having a different halide composition is present in a non-layer form either inside or on the surface of the grains (if this heterogeneous part is present on the surface of the grains, it joins to edges, corners or faces of the grains). To attain high sensitivity, the second and the third types of grains, rather than the grains of a "homogeneous" structure, are advantageously used and they are preferred from the viewpoint of pressure resistance, in the case where silver halide grains have those structures, the boundary between the areas having different halide compositions may be clear-cut or indefinite, forming mixed crystals in the latter case depending upon the compositional difference. If desired, a continuous structural change may be intentionally imparted to the grains.

A so-called "high AgCl emulsion" having high AgCl content is preferably used in light-sensitive materials that are suitable for rapid processing. For the purposes of the present invention, the AgCl content of the "high AgCl emulsion" is preferably at least 90 mol %, more preferably at least 95 mol %.

The preferred structure of the "high AgCl emulsion" is such that the phase where silver bromide is localized is present, either in a layer or non-layer form, in the interior and/or on the surface of silver halide grains. The halide composition of that local phase preferably has a AgBr content of at least 10 mol %, more preferably exceeding 20 mol %. Such a local phase may be present either in the interior of grains or on edges, corners or faces of their surfaces; a preferred example is such that the local phase has grown epitaxially at corners of grains.

With a view to minimizing the possible drop in sensitivity that occurs when a pressure is exerted upon light-sensitive materials, grains having a "homogeneous structure" where the internal distribution of halide composition is small may preferably be used in "high AgCl emulsions" having a AgCl content of at least 90 mol %.

Further enhancing the AgCl content of silver halide emulsions is effective for the purpose of reducing the replenishment of the developing solution and/or other photographic processing solutions. In this case, substantially pure AgCl emulsions having a AgCl content of 98–100 mol % may also be used with preference.

The silver halide grains contained in the silver halide emulsion to be used in the present invention preferably have an average particle size of 0.1–2 µm. In the present invention, the particle size is expressed by the diameter of an equivalent circle having the same area as the projected area of an individual grain and the mean average of this particle size for a given population of sample grains is taken as the "average particle size". Those silver halide grains are preferably of a "monodisperse" type whose particle size distribution is such that the coefficient of variation (i.e., the standard deviation of the particle size distribution divided by the average particle size) is 20% or less, desirably 15% or less. With a view to attaining a broader latitude, two or more emulsions of the monodisperse type described above may preferably be used as a blend in the same layer or they may be applied to form coatings in superposition.

The silver halide grains to be incorporated in photographic emulsions may have regular crystallographic forms such as cubes, tetradecahedra and octahedra, or they may have irregular crystallographic forms such as spheres and plates, or their shapes may be combinations of those regular and/or irregular forms. Alternatively, mixtures of grains having various crystallographic forms may be employed. It is preferred for the purposes of the present invention to use silver halide grains at least 50%, preferably at least 70%, more preferably at least 90%, of which are comprised of grains having the regular crystallographic forms illustrated above.

Another group of emulsions that are preferably used in the present invention are those in which tabular grains having an average aspect ratio (the ratio of the diameter of an equivalent circle to the thickness) of at least 5, preferably at least 8, account for than 50% of all the grains in terms of the projected area.

The silver chloride emulsions to be used in the present invention can be prepared by various method such as those described in P. Glafkides, Chimie et Physique Photographique, Paul Montel 1967, G. F. Duffiin, Photographic Emulsion Chemistry, Focal Press 1966 and V. L. Zelikman et al., Making and Coating Photographic emulsions, Focal Press 1964. Stated more specifically, any known methods may be employed, such as the acid method, neutral method and the ammoniacal method; and soluble silver salts may be reacted with soluble halogen salts by any method such as the single-jet method, the double-jet method or the combination thereof. It is also possible to use the "reverse precipitation" method, in which grains are formed in a Ag ion rich atmosphere. A variant of the double-jet method is a "controlled double-jet method", in which the pAg in the liquid phase where a silver halide is to be generated is held at a constant level. This method is capable of producing a silver halide emulsion comprising grains having regular crystallographic forms and a nearly uniform particle size.

For the purpose of achieving improvements in various aspects such as high intensity reciprocity law failure and keeping quality, various polyvalent metal ion impurities are preferably introduced in the process of forming those emulsion grains or during physical ripening. Examples of the compounds that can be used include salts of cadmium, zinc, lead, copper, thallium, etc., as well as salts or complex salts of elements of group VIII of the periodic table, such as iron, ruthenium, rhodium, palladium, osmium, iridium and platinum. The elements of group VIII may be used with particular preference. The amount of addition of the compounds exemplified above is variable over a broad range depending upon the object but they are preferably added in amounts of $10^{-9}$ to $10^{-2}$ mole per mole of silver halide. It is particularly effective for the purposes of the present invention to use iridium, rhodium, iron and cadmium either on their own or as admixtures.

The silver halide emulsions to be used in the present invention are usually subjected to chemical sensitization and spectral sensitization.

To perform chemical sensitization, sulfur sensitization typified by the addition of instable sulfur compounds, noble metal sensitization typified by gold sensitization and reduction sensitization may be applied either independently or in combination. For the compounds that are preferably used in chemical sensitization, see OPI (Unexamined Published Japanese Patent Application) No. 215272/1987, page 18, lower right column to page 22, upper right column. It is particularly preferred for the purposes of the present invention to perform gold sensitization in combination with sulfur sensitization.

Spectral sensitization is performed for the purpose of providing the emulsions in respective layers of the light-sensitive material of the present invention with spectral sensitivity to light in desired wavelength ranges. In the present invention, it is preferred to add spectral sensitizers, or dyes that will absorb the light in the wavelength ranges corresponding to the intended spectral sensitivities. Exemplary spectral sensitizers that can be used are described in F. M. Harmer, Heterocyclic Compounds—Cyanine Dyes and Related Compounds, John Wiley & Sons, New York, London 1964. For specific compound examples and the method of spectral sensitization that can preferably be used, see OPI 215272/1987, supra, page 22, upper right column to page 38.

Various compounds or precursors thereof may be added to the silver halide emulsions for use in the present invention in order to attain such purpose as preventing the occurrence of fogging during the production, storage or photographic processing of light-sensitive materials or stabilizing the photographic performance. For specific examples of those compounds that are preferably used, see OPI 215272/1987, supra, pages 39 to 72.

The emulsions to be used in the present invention are so-called "surface sensitive emulsions" which form a latent image predominantly on the surfaces of grains.

When using a semiconductor laser as a light source of performing digital exposure in the present invention, it is necessary to perform efficient spectral sensitization to the infrared region. Particularly, for spectral sensitization to the region higher than 730 nm, a suitable sensitizing dye may be selected from among those represented by the following general formulas (Q-I), (Q-II) and (Q-III). These sensitizing dyes are chemically fairly stable, will adsorb fairly strongly onto the surfaces of silver halide grains and are resistant to desorption by dispersions of concomitant couplers, etc.

The sensitizing dyes represented by the general formulas (Q-I), (Q-II) and (Q-III) are described below in detail.

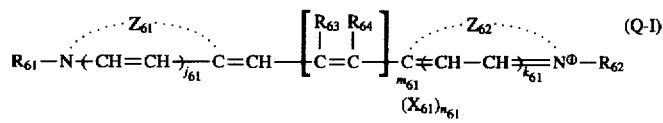

where $Z_{61}$ and $Z_{62}$ each represents the atomic group necessary to form a heterocyclic nucleus.

Preferred examples of the heterocyclic nucleus are 5- or 6-membered cyclic nuclei that contain a nitrogen atom and other hetero atoms, optionally a sulfur atom, an oxygen atom, a selenium atom or a tellurium atom (a condensed ring may be further bound to those rings and substituents may also be further bound).

Specific examples of the above-mentioned heterocyclic nuclei include a thiazole nucleus, a benzothiazole nucleus, a naphthothiazole nucleus, a selenazole nucleus, a benzoselenazole nucleus, a naphthoselenazole nucleus, an oxazole nucleus, a benzoxazole nucleus, a naphthoxazole nucleus, an imidazole nucleus, a benzimidazole nucleus, a naphthoimidazole nucleus, a 4-quinoline nucleus, a pyrroline nucleus, a pyridine nucleus, a tetrazole nucleus, an indolenine nucleus, a benzindolenine nucleus, an indole nucleus, a tellurazole nucleus, a benzotellurazole nucleus and a naphthotellurazole nucleus.

In the general formula (Q-I), $R_{61}$ and $R_{62}$ each represents an alkyl group, an alkenyl group, an alkinyl group or an aralkyl group. It should be understood that the groups as described above and hereunder cover those which have substituents. To take an alkyl group as an example, it covers both an unsubstituted and a substituted alkyl group, which may be straight-chained, branched or cyclic. The alkyl group preferably has 1–8 carbon atoms.

In the case of substituted alkyl groups, exemplary substituents include a halogen atom (e.g., chlorine, bromine and fluorine), a cyano group, an alkoxy group, a substituted or unsubstituted amino group, a carboxylic acid group, a sulfonic acid group and a hydroxyl group. These substituents may be present either independently or in combination.

A specific example of the alkenyl group may be a vinylmethyl group.

Specific examples of the aralkyl group include a benzyl group and a phenethyl group.

In the general formula (Q-I), $m_{61}$ represents a positive number of 1, 2 or 3.

In the general formula (Q-I), $R_{63}$ represents a hydrogen atom; $R_{64}$ represents a hydrogen atom, a lower alkyl group or an aralkyl group; if desired, $R_{64}$ may combine with $R_{62}$ to form a 5- or 6-membered ring; when $R_{64}$ represents a hydrogen atom, $R_{63}$ may combine with other $R_{63}$ to form a hydrocarbon ring or a hetero ring, which rings are preferably 5- or 6-membered; $j_{61}$ and $k_{61}$ each represents 0 or 1; $X_{61}$ represents an acid anion; and $n_{61}$ represents 0 or 1.

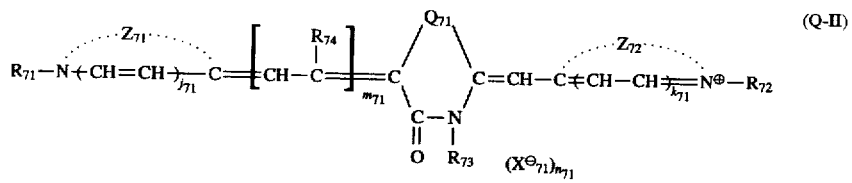

(Q-II)

where $Z_{71}$ and $Z_{72}$ have the same meaning as $Z_{61}$ or $Z_{62}$; $R_{71}$ and $R_{72}$ have the same meaning as $R_{61}$ or $R_{62}$; $R_{73}$ represents an alkyl, alkenyl, alkinyl or aryl group (e.g., a substituted or unsubstituted phenyl group); $m_{71}$ represents 2 or 3; $R_{74}$ represents a hydrogen atom, a lower alkyl group or an aryl group and may optionally combine with other $R_{74}$ to form a hydrocarbon ring or a hetero ring, provided that those rings are preferably 5- or 6-membered; $Q_{71}$ represents a sulfur atom, an oxygen atom, a selenium atom or >N—$R_{75}$; $R_{75}$ has the same meaning as $R_{73}$; $j_{71}$, $k_{71}$, $X_{71}^{\ominus}$ and $n_{71}$ have the same meanings as $j_{61}$, $k_{61}$, $X_{61}^{\ominus}$ and $n_{61}$, respectively.

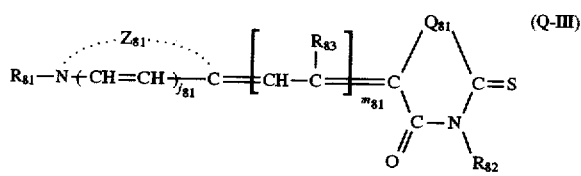

(Q-III)

where $Z_{81}$ represents the atomic group necessary to form a hetero ring which may be the same as those mentioned in connection with $Z_{61}$ and $Z_{62}$; other specific examples of the hetero ring include nuclei such as thiazolidine, thiazoline, benzothiazoline, naphthothiazoline, selenazolidine, selenazoline, benzoselenazoline, naphthoselenazoline, benzoxazoline, naphthoxazoline, dihydropyridine, dihydroquinoline, benzimidazoline and naphthoimidazoline.

In the general formula (Q-III), $Q_{81}$ has the same meaning as $Q_{71}$; $R_{81}$ has the same meaning as $R_{61}$ or $R_{62}$ and $R_{82}$ has the same meaning as $R_{73}$; $m_{81}$ represents 2 or 3; $R_{83}$ either has the same meaning as $R_{74}$ or may optionally combine with other $R_{83}$ to form a hydrocarbon ring or a hetero ring; and $j_{81}$ has the same meaning as $j_{61}$.

Preferred examples of the sensitizing dye that is represented by the general formula (Q-I) are such that the heterocyclic nuclei formed by $Z_{61}$ and/or $Z_{62}$ have, in particular, a naphthothiazole nucleus, a naphthoselenazole nucleus, a naphthoxazole nucleus, a naphthoimidazole nucleus or a 4-quinoline nucleus. This is also true with $Z_{71}$ and/or $Z_{72}$ in the general formula (Q-II), as well as $Z_{81}$ in the general formula (Q-III). Other preferred examples of the sensitizing dye are such that the methine chain forms a hydrocarbon ring or a hetero ring.

Infrared sensitization relies upon sensitization by the M-band of sensitizing dyes, so the spectral sensitivity distribution in generally broader than in the sensitization by the J-band. Under the circumstances, it is preferred to modify the spectral sensitivity distribution by providing a dye-containing tinted layer in one or more colloidal layers that are closer to the light-sensitive side than a predetermined light-sensitive layer. The tinted layer has a filter effect and hence is effective in preventing the mixing of colors.

Sensitizing dyes that are preferably used for infrared sensitization are those compounds which have reduction potentials of −1.05 V (vs SCE) or of meaner values. Particularly, preferred compounds are those which have reduction potentials of −1.10 V or of meaner values. Sensitizing dyes having this characteristic are advantageous for achieving higher sensitivity, particularly for stabilizing the sensitivity and latent image.

Reduction potentials can be measured by phase discriminating second-harmonic generating ac polarography, with a dropping mercury electrode, a saturated calomel electrode and platinum used as a working electrode, a reference electrode and a counter electrode, respectively. Measurement of reduction potentials by phase discriminating second-harmonic generating ac voltammetry using platinum in the working electrode is described in Journal of Imaging Science, 30, p. 27–35, 1986.

Specific examples of the sensitizing dyes that can be used in the present invention are described in OPI No. 157749/1990, page 8, lower left column, line 1 to page 13, lower right column, line 2. Besides the compounds described in that patent, the following compound (Q-120) can also be used:

(Q-120)

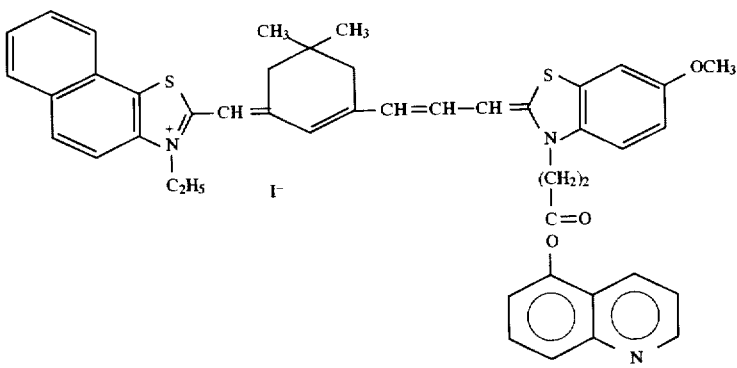

In order to incorporate those spectral sensitizing dyes into silver halide emulsions, they may be directly dispersed in the emulsions or, alternatively, they may be added to the emulsions as solutions in such solvents as water, methanol, ethanol, propanol, methyl cellosolve, 2,2,3,3-tetrafluoropropanol, etc. that may be used either on their own or as admixtures. If desired, aqueous solutions of the spectral sensitizers may be prepared in the presence of acids or bases as described in Examined Japanese Patent Publication Nos. 23389/1969, 27555/1969, 22089/1082, etc., or aqueous solutions or colloidal dispersions of the spectral sensitizers may be prepared in the presence of surfactants as described in U.S. Pat. Nos. 3,822,135, 4,006,025, etc.; these aqueous solutions or colloidal dispersions are then added to the emulsions. Alternatively, the spectral sensitizers may be dissolved in phenoxyethanol and other solvents that are substantially immiscible with water and the resulting solutions are dispersed in water or hydrophilic colloids in preparation for addition to the emulsions. As described in OPI Nos. 102733/1978 and 105141/1983, the spectral sensitizers may be directly dispersed in hydrophilic colloids, with the dispersions being subsequently added to the emulsions. The spectral sensitizers may be added to the emulsions at any of the stages of emulsion preparation that have heretofore been known as useful; namely, they may be added at any stage that is selected from among the following: prior to the formation of silver halide emulsion grains, during the formation of those grains, immediately after the formation of those grains but prior to the step of washing with water, prior to chemical sensitization, during chemical sensitization, immediately after chemical sensitization but prior to the solidification of the emulsions upon cooling, and during the preparation of coating solutions. Most commonly, the spectral sensitizers are added at a stage after the end of chemical sensitization and prior to the start of coating operations. However, the spectral sensitizers may be added at the same time as chemical sensitizers so that spectral sensitization is achieved simultaneously with chemical sensitization, as described in U.S. Pat. Nos. 3,628,969 and 4,225,666; alternatively, spectral sensitization may precede chemical sensitization as described in OPI No. 113928/1983. If desired, the spectral sensitizers may be added so as to start spectral sensitization before the end of precipitation of silver halide grains. Further, as thought in U.S. Pat. No. 4,225,666, supra, spectral sensitizers may be added in divided portions, namely, part of them are added prior chemical sensitization while the remainder is added after chemical sensitization. As typically taught in U.S. Pat. No. 4,183,756, spectral sensitizers may be added at any stage of the formation of silver halide grains. Among the various methods described above, it is particularly preferred to add the spectral sensitizers prior to either the step of washing emulsions with water or their chemical sensitization.

The amount of addition of those spectral sensitizing dyes is variable over a broad range depending on the situation and the preferred range is from $0.5 \times 10^{-6}$ mole to $1.0 \times 10^{-2}$ mole per mole of silver halide, with a more preferred range being from $1.0 \times 10^{-6}$ mole to $5.0 \times 10^{-3}$ mole per mole of silver halide.

For red or infrared sensitization by the M-band to be preformed in the present invention, supersensitization with the compounds described in OPI No. 157749/1990, supra, page 13, lower right column, line 3 to page 22, lower right column, line 3 from the bottom is particularly effective.

The constitution of the photographic material to be processed by the image forming method of the present invention is described below. The photographic material has at least three silver halide emulsion layers on a base and at least two of them preferably have spectral sensitivity maxima at 670 nm and above. Those light-sensitive layers preferably contain at least one type of coupler that will form color upon coupling reaction with the oxidation product of an aromatic amino compound. A light-sensitive material for use in full-color hard copying preferably contains silver halide light-sensitive layers having at least three different color sensitivities, each layer containing either one of couplers that form a yellow, magenta or cyan color upon coupling reaction with the oxidation product of an aromatic amino compound. The three different spectral sensitivities can be selected at any desired values depending upon the wavelength of the light source used in digital exposure; however, from the viewpoint of effective color separation, it is preferred that two most neighboring spectral sensitivity maxima are spaced apart by at least 30 nm. There is no particular limitation on the correspondence between the light-sensitive layers ($\lambda 1$, $\lambda 2$, $\lambda 3$) having at least three different spectral sensitivity maxima and the color-forming couplers (Y, M, C) to be contained in those layers. Thus, 6 (3×2) combinations are possible. There also is no particular limitation on the order in which the light-sensitive layers having at least three different spectral sensitivity maxima are to be coated on a base; however, it is sometimes preferred from the viewpoint of rapid processing that a light-sensitive layer that contains silver halide grains of the largest average particle size and that has a spectral sensitivity at the longest wavelength is situated topmost. Hence, there are 36 possible combinations of the three spectral sensitivities, the three color forming couplers and the order of layer arrangement. The method of the present invention is equally applicable to all of the 36 types of light-sensitive material. In the present invention, it is particularly preferred to use a semiconductor laser as a light source for digital exposure. In this case, at least one of the three silver halide light-sensitive layers having at least three different colors sensitivities preferably has a maximum spectral sensitivity at 730 nm and above whereas at least two of those layers preferably have spectral sensitivity maxima in the longer wavelength range at 670 nm and above. In this case, too, three is no limitation on the spectral sensitivity maxima, color forming couplers and the order of layer arrangement. Table 1 below shows specific examples of the combination of the light source for digital exposure, spectral sensitivity maxima and color forming coupler; it should, however be noted that those are not the sole examples of the present invention.

TABLE 1

| Light source for digital exposure | | | Spectral sensitivity maxima of photographic material (nm) |
|---|---|---|---|
| Light source | Wavelength (nm) | Coupler | |
| 1 AlGaInAs(670) | 670 | C | 670 |
| GaAlAs(750) | 750 | Y | 730 |
| GaAlAs(810) | 810 | M | 810 |
| 2 AlGaInAs(670) | 670 | Y | 670 |
| GaAlAs(750) | 750 | M | 730 |
| GaAlAs(810) | 810 | C | 810 |
| 3 AlGaInAs(670) | 670 | M | 670 |
| GaAlAs(750) | 750 | C | 750 |
| GaAlAs(830) | 830 | Y | 830 |
| 4 AlGaInAs(670) | 670 | Y | 670 |
| GaAlAs(780) | 780 | M | 780 |
| GaAlAs(830) | 830 | C | 840 |
| 5 AlGaInAs(670) | 670 | C | 670 |
| GaAlAs(780) | 780 | M | 780 |
| GaAlAs(880) | 880 | Y | 880 |
| 6 GaAlAs(780) | 780 | M | 780 |
| GaAlAs(830) | 830 | Y | 830 |
| GaAlAs(880) | 880 | C | 880 |
| 7 GaAs(1200) + SHG[1] | 600 | M | 600 |
| AlGaInAs(670) | 670 | Y | 670 |
| GaAlAs(880) | 750 | C | 750 |
| 8 LED(580) | 580 | Y | 580 |
| LED(670) | 670 | M | 670 |
| LED(810) | 810 | C | 810 |

[1]SHG: Second harmonic wave generated with a nonlinear optical device.

The step of exposure to be preformed in the present invention is described below. The photographic material used in the present invention is intended to be subjected to digital exposure by scanning a high-density beam as from a laser or LED over the photographic material under relative movement. Hence, the time for which the silver halide in the photographic material is exposed is equivalent to the time required for exposing a certain small area. This small area is generally expressed by the smallest unit for controlling the quantity of light each digital data and it is referred to as "a pixel". Therefore, the time of exposure per pixel is variable with the size of one pixel, which in turn is dependent on the density of pixels. A practical range for the density of pixels is from 50 to 2000 dpi. If the exposure time is defined as the time required to expose pixels of a size that corresponds to a density of 400 dpi, the preferred exposure time is $10^{-6}$ sec or shorter, with $10^{-7}$ sec and less being more preferred.

For such purposes as improving the sharpness of an image, dyes (specially oxonol dyes) that can be decolored upon processing as described in the specification of EPO 337,490A2, pp. 27–76 are preferably added to hydrophilic colloidal layers in the photographic material of the present invention in such amounts that said photographic material will have an optical reflection density of at least 0.70 at the wavelength 680 nm; it is also preferred that titanium dioxide surface-treated with di- to tetrahydric alcohols (e.g., trimethylolethane) is contained in an amount of at least 12 wt % (more preferably at least 14 wt %) in the water-resistant resin layer on the base.

Further, compounds capable of improving the keeping quality of a color image as described in the specification of EPO 277,589A2 are preferably used together with couplers in the photographic material to be processed by the present invention. It is particularly preferred to use those compounds with a pyrazoloazole coupler. Stated more specifically, a compound (F) that binds chemically with a residual aromatic amino developing agent remaining after color development so as to form a chemically inert and substantially colorless compound and/or a compound (G) that binds chemically with the residual oxidation product of an aromatic amino developing agent remaining after color development so as to form a chemically inert and substantially colorless compound may be used simultaneously or independently; this is preferred for the purpose of preventing staining and other side effect that would other wise occur on account of the generation of color forming dyes due to the reaction between the coupler and residual color developing agent or its oxidation product remaining in the light-sensitive material during storage after processing.

Further, in order prevent the growth of various fungi and bacteria in hydrophilic colloidal layers that will deteriorate the image quality, the photographic material to be processed by the present invention preferably contains mold inhibitors of the type described in OPI No. 271247/1988.

Various supports or bases may be used with the photographic material to be processed by the present invention. For display purposes, a white polyester-based support or a base having a white pigment containing layer formed on the side having silver halide emulsion layers may be used. In order to provide further improved sharpness, an anti-halo layer is preferably provided either on the side of the base where silver halide emulsion layers are coated or on the back side. It is particularly preferred to set the transmission density of the base within the range of 0.35–0.8 in order to insure that a display can be observed under both reflected and transmitted light.

The exposed photographic material can be subjected to conventional procedures of black-and-white or color development. However, color photographic materials are preferably subjected to bleach-fixing after color development in order to achieve rapid processing. It should be particularly noted that in the case of using a high AgCl emulsion of the type described hereinabove, the pH of the bleach-fixing solution is preferably adjusted to ca. 6.5 and below, more preferably about 6 and below, for such purposes as accelerated desilvering.

For the preferred examples of silver halide emulsions and other ingredients (e.g., additives), as well as photographic constituent layers (e.g., layer arrangement) that are to be applied to the photographic material to processed by the present invention, and as regards the processing methods and additives that are to be applied for processing that photographic material, see the following tables where relevant information is quoted from three patents, among which EPO 355,660A2 (corresponding to Japanese Patent Application No. 107011/1989) is most pertinent.

TABLE 2

| Photographic constituent element, etc. | OPI No. 215272/1987 | OPI No. 33144/1990 | EOP 355,660A2 |
|---|---|---|---|
| Silver halide emulsion | p. 10, upper right col., l. 6 to p. 12, lower left col., l. 5 and p. 12, lower right col., l. 4 from the bottom to p. 13, upper left col., l. 17 | p. 28, upper right col., l. 16 to p. 29, lower right col., l. 11 and p. 30, l. 2–5 | p. 45, l. 53 to p. 47 l. 3 and p. 47, l. 20–22 |
| Silver halide solvent | p. 12, lower left col., l. 6–14 and p. 13, upper left col., l. 3 to p. 18, lower left col., last line | — | — |
| Chemical sensitizer | p. 12, lower left col., l. 3 from the bottom to lower right col., l. 5 from the bottom and p. 18, lower right col., l. 1 to p. 22, upper right col., l. 9 from the bottom | p. 29, lower right col., l. 12 to the last line | p. 47, l. 4–9 |
| Spectral sensitizer (in spectral sensitization) | p. 22, upper right col., l. 8 from the bottom to p. 38, last line | p. 30, upper left col., l. 1–13 | p. 47, l. 10–15 |
| Emulsion stabilizer | p. 39, upper left col., l. 1 to p. 72, upper right col., last line | p. 30, upper left col., l. 14 to upper right col., l. 1 | p. 47, l. 16–19 |
| Development accelerator | p. 72, lower left col., l. 1 to p. 91, upper right col., l. 3 | — | — |
| Color couplers (cyan, magenta and yellow couplers) | p. 91, upper right col., l. 4 to p. 121, upper left col., l. 6 | p. 3, upper right col., l. 14 to p. 18, upper left col., last line and p. 30, upper right col., l. 6 to p. 35, lower right col., l. 11 | p. 4, l. 15–27; p. 5, l. 30 to p. 28, last line; p. 45, l. 29–31; p. 47, l. 23 to p. 63, l. 50 |
| Color intensifier | p. 121, upper left col., l. 7 to p. 125, upper right col., l. 1 | — | — |
| UV absorber | p. 125, upper right col., l. 2 to p. 127, lower left col., last line | p. 37, lower right col., l. 14 to p. 38, upper left col., l. 11 | p. 65, l. 22–31 |
| Anti-fading additive (image (stabilizer) | p. 127, lower right col., l. 1 to p. 137, lower left col., l. 8 | p. 36, upper right col., l.12 to p. 37, upper left col., l. 19 | p. 4, l. 30 to p. 5 l. 23; p. 29, l. 1 to p. 45, l. 25; p. 45, l. 33–40; p. 65, l. 2–21 |
| High-boiling and/or low-boiling organic solvent | p. 137, lower left col., l. 9 to p. 144, upper right col., last line | p. 35, lower right col., l. 14 to p. 36, upper left col., l. 4 from the bottom | p. 64, l. 1–51 |
| Method of dispersing photographic addenda | p. 144, lower left col., l. 1 to p. 146, upper right col., l. 7 | p. 27, lower right col., l. 10 to p. 28, upper left col., last line and p. 35, lower right col., l. 12 to p. 36, upper right col., l. 7 | p. 63, l. 51 to p. 64, l. 56 |

TABLE 3

| Photographic constituent element, etc. | OPI No. 215272/1987 | OPI No. 33144/1990 | EPO 355,660A2 |
|---|---|---|---|
| Color couplers (cyan, magenta and yellow couplers) | p. 91, upper right col., l. 4 to p. 121, upper left col., l. 6 | p. 3, upper right col., l. 14 to p. 18, upper left col., last line and p. 30, upper right col., l. 6 to p. 35, lower right col., l. 11 | p. 4, l. 15–27; p. 5 l. 30 to p. 28, last line; p. 45, l. 29–31; p. 47, l. 23 to p. 63, l. 50 |
| Color intensifier | p. 1221, upper left col., l. 7 to p. 125, upper right col., l. 1 | — | — |
| UV absorber | p. 125, upper right col., l. 2 to p. 127, lower left | p. 37, lower right col., l. 14 to p. 38, upper | p. 65, l. 22–31 |

TABLE 3-continued

| Photographic constituent element, etc. | OPI No. 215272/1987 | OPI No. 33144/1990 | EPO 355,660A2 |
|---|---|---|---|
| Anti-fading additive (image stabilizer) | col., last line p. 127, lower right col., l. 1 to p. 137, lower left col., l. 8 | left col., l. 11 p. 36, upper right col., l. 12 to p. 37, upper left col., l. 19 | p. 4, l. 30 to p. 5 l. 23; p. 29, l. 1 to p. 45, l. 25; p. 45, l. 33-40; p. 65, l. 2-21 |
| High-boiling and/or low-boiling organic solvent | p. 137, lower left col., l. 9 to p. 144, upper right col., last line | p. 35, lower right col., l. 14 to p. 36, upper left col., l. 4 from the bottom | p. 64, l. 1-51 |
| Method of dispersing photographic addenda | p. 144, lower left col., l. 1 to p. 146, upper right col., l. 7 | p. 27, lower right col., l. 10 to p. 28, upper left col., last line and p. 35, lower right col., l. 12 to p. 36, upper right col., l. 7 | p. 63, l. 51 to p. 64, l. 56 |

TABLE 4

| Photographic constituent element, etc. | OPI No. 215272/1987 | OPI No. 33144/1990 | EPO 355,660A2 |
|---|---|---|---|
| Hardener | p. 146, upper right col., l. 8 to p. 155, lower left col., l. 4 | — | — |
| Precursor of developing agent | p. 155, lower left col., l. 5 to p. 155, lower right col., l. 2 | — | — |
| Development restrainer releasing compound | p. 155, lower right col., l. 3-9 | — | — |
| Base | p. 155, lower right col., l. 19 to p. 156, upper left col., l. 14 | p. 38, upper right col., l. 18 to p. 39, upper left col., l. 3 | p. 66, l. 29 to p. 67, l. 13 |
| Arrangement of light-sensitive layers | p. 156, upper left col., l. 15 to p. 156, lower right col., l. 14 | p. 28, upper right col., l. 1-15 | p. 45, l. 41-62 |
| Dye | p. 156, lower right col., l. 15 to p. 184, lower right col., last line | p. 38, upper left col., l. 12 to upper right col., l. 7 | p. 66, l. 18-22 |
| Anti-color mixture agent | p. 185, upper left col., l. 1 to p. 188, lower right col., l. 3 | p. 36, upper right col., l. 8-11 | p. 64, l. 57 to p. 65, l. 1 |
| Contrast control agent | p. 188, lower right col., l. 4-8 | — | — |
| Antistain agent | p. 188, lower right col., l. 9 to p. 193, lower right col., l. 10 | p. 37, upper left col., last line to lower right col., l. 13 | p. 65, l. 32 to p. 66, l. 17 |

TABLE 5

| Photographic constituent element, etc. | OPI No. 215272/1987 | OPI No. 33144/1990 | EPO 355,660A2 |
|---|---|---|---|
| Surfactant | p. 201, lower left col., l. 1 to p. 210, upper right col., last line | p. 18, upper right col., l. 1 to p. 24, lower right col., last line and p. 27, lower left col., l. 10 from the bottom to lower right col., l. 9 | — |
| Fluorine-containing compounds (as antistat, coating aid, lubricant, anti-blocking | p. 210, lower left col., l. 1 to p. 222, lower left col., l. 5 | p. 25, upper left col., l. 1 to p. 27, lower right col., l. 9 | — |

TABLE 5-continued

| Photographic constituent element, etc. | OPI No. 215272/1987 | OPI No. 33144/1990 | EPO 355,660A2 |
|---|---|---|---|
| agent, etc.) | | | |
| Binder (hydrophilic colloid) | p. 222, lower left col., 1. 6 to p. 225, upper left col., last line | p. 38, upper right col., 1. 8–18 | p. 66, 1. 23–28 |
| Thickener | p. 225, upper right col., 1. 1 to p. 227, upper right col., 1. 2 | — | — |
| Antistat | p. 227, upper right col., 1. 3 to p. 230, upper left col., 1. 1 | — | — |
| Polymer latex | p. 230, upper left col., 1. 2 to p. 239, last line | — | — |
| Matting agent | p. 240, upper left col., 1. 1 to p. 240, upper right col., last line | — | — |

TABLE 6

| Photographic constituent element, etc. | OPI No. 215272/1987 | OPI No. 33144/1990 | EPO 355,660A2 |
|---|---|---|---|
| Photographic processing method (e.g. scheme and addenda) | p. 3, upper right col., 1. 7 to p. 10, upper right col., 1. 5 | p. 39, upper left col., 1. 4 to p. 42, upper left col., last line | p. 67, 1. 14 to p. 69, 1. 28 |

Note:
Quotations from OPI No. 215272/1987 include the amendments effected by the written amendment of March 16, 1987 and described at the end of the official gazette.
Among the color couplers listed in Table 3, the so-called "short-wavelength shifted yellow couplers" described in OPI Nos. 231451/1988, 123047/1988, 241547/1988, 173499/1989, 213648/1989 and 250944/1989 are preferably used as yellow couplers.

Besides the diphenylimidazole containing cyan couplers described in OPI No. 33144/1990, supra, various other cyan couplers may preferably be used and they include the 3-hydroxypyridine containing cyan couplers described in the specification of EPO 333,185A2 (among them, coupler (42) which is listed as a specific example is particularly preferred if this 4-eqivalent coupler is rendered 2-eqivalent by introducing a Cl leaving group; couplers (6) and (9) are also particularly preferred) and the cyclic active methylene containing couplers described in OPI No. 32260/1989 (among them, exemplary couplers 3, 8 and 34 which are listed as specific examples are particularly preferred).

The color developing solution to be used in the present invention is applied at a working temperature of 20°–50° C., preferably 30°–45° C. The processing time is preferably controlled to be substantially within 20 sec. The smaller the replenishment of the developing solution, the better and the amount of replenishment is advantageously in the range of 20–600 ml, preferably 50–300 ml, per square meter of the photographic material. A more preferred range is 60–200 ml, and the most preferred range is 60–150 ml.

As already mentioned, the development time is preferably controlled in the present invention to be substantially within 20 sec. The term "substantially" is used to make it clear that the development time refers to the time from the entrance of the tip of the photographic material into a developing solution tank to the entrance of that tip into the next tank; in other words, the development time as used herein shall include the air time, or the solution cross-over time from a certain development tank to the next one.

The washing step or the stabilization step is preferably conducted at a pH of 4–10, with the range of 5–8 being more preferred. The temperature for those steps can be set at various values depending upon such factors as the use and characteristics of the photographic material to be processed. Generally, the temperature is adjusted to 30°–45° C., preferably 35°–42° C. The time for those steps can also be set at any desired values but from the viewpoint of shortening the overall processing time, the time for the washing and stabilizing steps is desirably as short as possible. A preferred range is 10–45 sec, with the range of 10–40 sec being more preferred. The replenishment of water or stabilizing solution is preferably as small as possible from the viewpoint of such factors as lower effluent levels and ease of handing.

As a guide figure, washing water or the stabilizing solution is replenished with 0.5–50 times, preferably 2–15 times, the carry-over from a preceding bath per unit area of the photographic material. In other words, the amount of replenishment is no more than 300 ml, preferably no more than 150 ml, per square meter of the photographic material.

The fluid used in the washing step and/or stabilizing step may be returned for use in the preceding step. As an example of this approach, an overflow of washing water that is curtailed by a multi-stage countercurrent system is permitted to flow into the preceding bleach-fix bath, which in turn is replenished with a concentrated solution, thereby reducing the amount of waste liquor.

The drying step that can be adopted in the present invention is now described below. In order to complete an image by rapid processing in accordance with the method of the present invention, the drying time is desirably controlled to lie within the range of 20 to 40 sec. To shorten the drying time, various means can be taken by two different approaches, one being directed to the photographic material and the other to the dryer. An example of the first approach is to reduce the content of a hydrophilic binder such as gelatin in the photographic material, thereby reducing the water content that is carried into the film. Another way to reduce the carry-in is absorbing water by wiping the photographic material with squeeze rollers, cloth, etc. as soon as it emerges from the washing bath. An obvious example of the second approach is to accelerate drying by elevating the temperature or increasing the intensity of a drying air. Another way to accelerate drying is adjusting the angle at which the drying air is blow against the photographic material or improving the efficiency of removing an exhaust air.

The photographic processing in accordance with the present invention is preferably conducted in such a way that the time of color development is no more than 20 sec and that the total processing time from the start of color development to the end of drying is no more than 90 sec.

Figure 2:
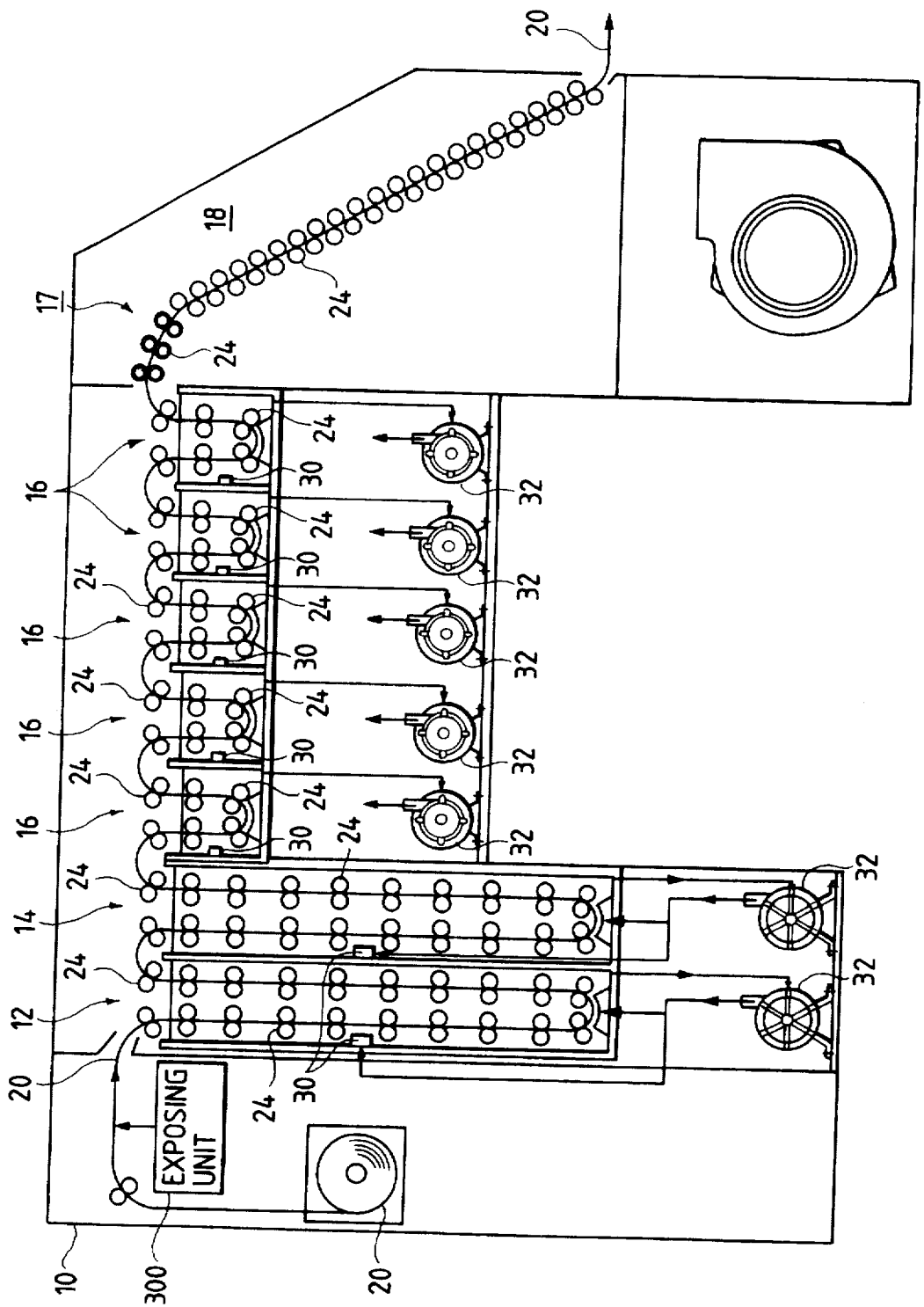
FIG. 2 is a diagram showing schematically an image forming apparatus with which the method of the present invention is implemented.

An embodiment of the present invention is described below with reference to FIGS. 2–9. It should however be noted that this is not the sole embodiment of the present invention. FIG. 2 is a diagram showing schematically an image forming apparatus for forming image on a silver halide photographic color paper in accordance with an embodiment of the present invention. After exposure, the color paper is developed, bleach-fixed, washed with water and dried to form an image on it. The color paper (hereunder referred to as a "photographic material") to be processed with the apparatus is a color photographic material that has on a base at least one silver halide emulsion layer containing at least 95 mol % of silver chloride and it is to be color developed with a color developing solution containing an aromatic primary amino color developing agent.

The main body 10 of the image forming apparatus contains in it an exposing unit 300, a developing tank 12, a bleach-fixing tank 14, washing tanks 16, a drain unit 17 and a drying unit 18 in succession. The exposed photographic material 20 is developed, bleach-fixed, washed with water and then dried before it is delivered from the main body 10. Each of the developing tank 12, bleach-fixing tank 14, washing tanks 16, drain unit 17 and drying unit 18 contains a plurality of transport roller pairs 24 that hold the photographic material 20 for transport through the respective processing units. The transport roller pairs 24 in the drain unit 17 also serve as rollers for removing water droplets from the surface of the photographic material 20 by squeezing, absorption, etc. The photographic material 20, which is being transported by the roller pairs 24 with the emulsion coated side facing down, is immersed in the processing solutions for predetermined times to perform color development and subsequent steps. In each of the developing tank 12, bleach-fixing tank 14 and washing tanks 16, a processing solution forcing member 30 is provided in a selected position, whereby an individual processing solution is gushed out to form a high-speed jet stream in the associated processing tank. A pump 32 is also provided for each of the developing tank 12, bleach-fixing tank 14 and washing tanks 16, so that the respective processing solutions are circulated by those pumps 32 and forced through the members 30 to be directed towards the photographic material 20.

Figure 3:
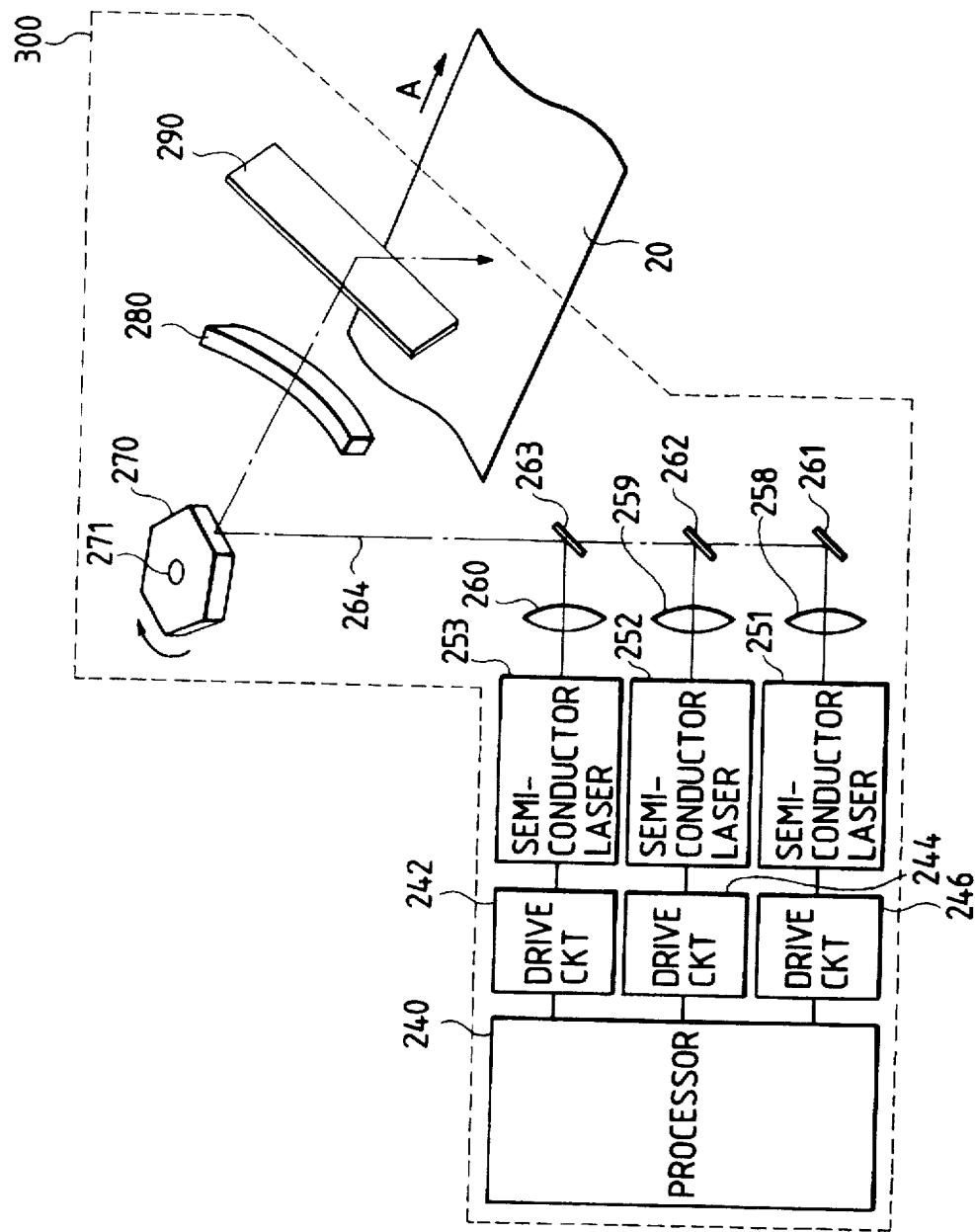
FIG. 3 is a diagram showing schematically the exposing unit in the apparatus.
Figure 5:
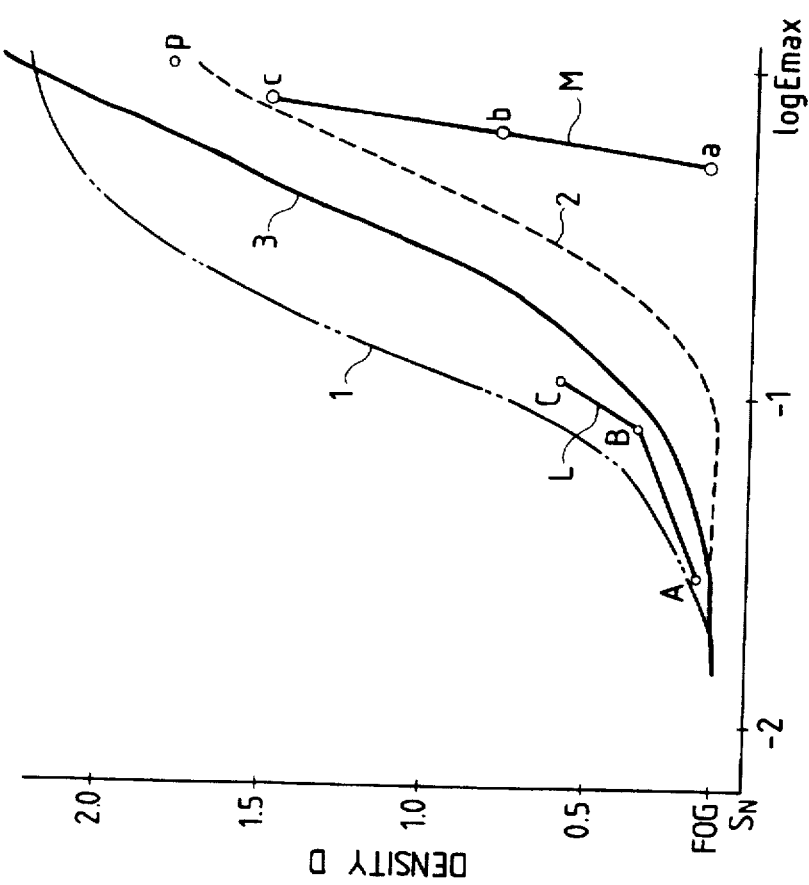
FIG. 5 is a graph showing the relationship between the quantity of light and image density as observed in the examples of the present invention.

FIG. 3 is a diagram showing schematically the exposing unit 300, which exposes the photographic material 20 by emitting a set of three light components of different colors. The exposing unit 300 has an image signal processor 240 that is connected to a computer or the like and which processes image data. In response to the processed image data, drive circuits 242, 244 and 246 drive associated semiconductor lasers 251, 252 and 253, thereby exposing the photographic material 20.

In the exposing unit 300, the light for forming a magenta color is generated by the semiconductor laser 251 which emits laser light at a wavelength of 750 nm. The semiconductor laser 251 may be LTO 30MF of Sharp Corp. The laser light emitted at 750 nm from the semiconductor laser 251 is shaped by passage through a collimator lens 258 and is incident on a total reflection mirror 261 which reflects said laser light towards a polygonal mirror 270.

The light for forming a cyan color is generated by the semiconductor laser 252 which emits laser light at a wavelength of 830 nm. The laser light emitted at 830 nm from the semiconductor laser 252 is shaped by passage through a collimator lens 259 and is incident on a dichroic mirror 262 which reflects said laser light towards the polygonal mirror 270. The dichroic mirror 262 transmits the light for forming a magenta color but reflects the light for forming a cyan color. The semiconductor laser 252 may be TOLD 152R of Toshiba Corp. or LTD 10MF of Sharp Corp.

The light for forming a yellow color is generated by the semiconductor laser 253 which emits laser light at a wavelength of 670 nm. The semiconductor laser 253 may be TOLD 9200 of Toshiba corp., NDL 3200 of NEC Corp. or SLD 151U of Sony Corp. The laser light emitted at 670 nm from the semiconductor laser 253 is shaped by passage through a collimator lens 260 and is incident on a dichroic mirror 263 which reflects said laser light towards the polygonal mirror 270. The dichroic mirror 263 transmits both the light for forming a magenta color and the light for forming a cyan color but reflects the light for forming a yellow color.

The three light beams for forming cyan, magenta and yellow colors travel in the same optical path 264 to be reflected by the polygonal mirror 270, pass through an f$\theta$ lens 280 and are further reflected by a mirror 290 to reach the photographic material 20. As the polygonal mirror 270 rotates about the axis 271, imaging light exposes the photographic material 20 by scanning over its surface. As the photographic material 20 moves in a direction (as indicated by arrow A) perpendicular to the fast-scan direction of laser light, it is scanned in the slow-scan direction to form an image. The speed at which the photographic material 20 moves during exposure is equal to the moving speed the development step and development of the exposed area of the photographic material 20 is started after the passage of equal times.

The exposing unit 300 is of such a design that the photographic material 20 is exposed on the basis of the image information processed with a computer or the like. Alternatively, the photographic material 20 may be exposed on the basis of the image information obtained by reading the original.

The image signal processor 240 supplies the drive circuits 242 to 246 with modulation control signals for outputting laser light on the basis of image information. In the embodiment under consideration, each modulation control signal consists of 10 bits, thus providing 1024 levels of modulation control in accordance with the image density. Such modulation control signals control the duration of driving semiconductor lasers in terms of the pulse width that varies at 1024 levels. Maximum light quantity $E_{max}$ from the exposing unit 300 is obtained by modulation control signal $S_0$ whereas minimum light quantity $E_{min}$ is obtained by modulation control signal $S_{1023}$. The photographic material is so designed that a density of 2.2 (free of fog) is obtained with maximum light quantity $E_{max}$.

The photographic material used has a characteristic curve which, when said material is processed with the image forming apparatus shown in FIG. 2 after exposure with the exposing unit shown in FIG. 3, is shaped as shown in FIG. 1. One feature of this characteristic curve is that it passes below the upper reference line L connecting the following three points on the coordinate system. A ($logE_{max}$–1.55, for+0.05), B ($logE_{max}$–1.10, fog+0.25) and C ($logE_{max}$–0.95, fog +0.50), with $E_{max}$ denoting a maximum quantity of light that is provided by the exposing unit. Another feature of the characteristic curve is that it passes above point P ($logE_{max}$, fog+1.70) corresponding to the density of (fog+ 1.70) at the maximum light quantity $E_{max}$. If the fog is assumed to take the value 0.1, the four points have the following coordinates: A ($logE_{max}$–1.55, 0.15), B($logE_{max}$–1.10, 0.35), C ($logE_{max}$–0.95, 0.60) and P ($logE_{max}$, 1.80).

Aside from the characteristics described above, the photographic material preferably has a gamma of 3.5 and below in the high-density area. It suffices for the purposes of the present invention that the characteristic curve passes below the upper reference line L; preferably, the curve passes above the lower reference line M that connects another set of three points: a ($logE_{max}$–0.3, fog+0.05), b ($logE_{max}$–0.2, fog+0.7), and c ($logE_{max}$–0.1, fog+1.4).

Let write $S_{1023}$ for the laser light modulation control signal that corresponds to a minimum density and also write $S_0$ for the laser light modulation control signal that corresponds to a maximum density. The, in the case of a photographic material having the characteristics shown by the solid line in FIG. 1, a modulation control signal that corresponds to laser light providing a density of 0.5 is $S_{820}$. In a region of control signals assigned greater numbers, a satisfactory multi-level image cannot be obtained with a photographic material having the characteristics indicated by the imaginary line which passes above the upper reference line L. However, if a photographic material having the characteristics specified herein by the present invention is subjected to digital exposure, an image of satisfactory gradation can be formed without density skips.

In the combination of the apparatus and the photographic material that are used in the embodiment under discussion, the characteristic curve for the area of light quantity at densities of no more than 0.5 where laser light is modulated with modulation control signals S that are assigned 820 and higher numbers for n in $S_n$ is such that it passes below the upper reference line which connects the three points A ($logE_{max}$–1.55, 0.15), B ($logE_{max}$–1.10, 0.35) and C ($logE_{max}$–0.95, 0.60).

Figure 7:
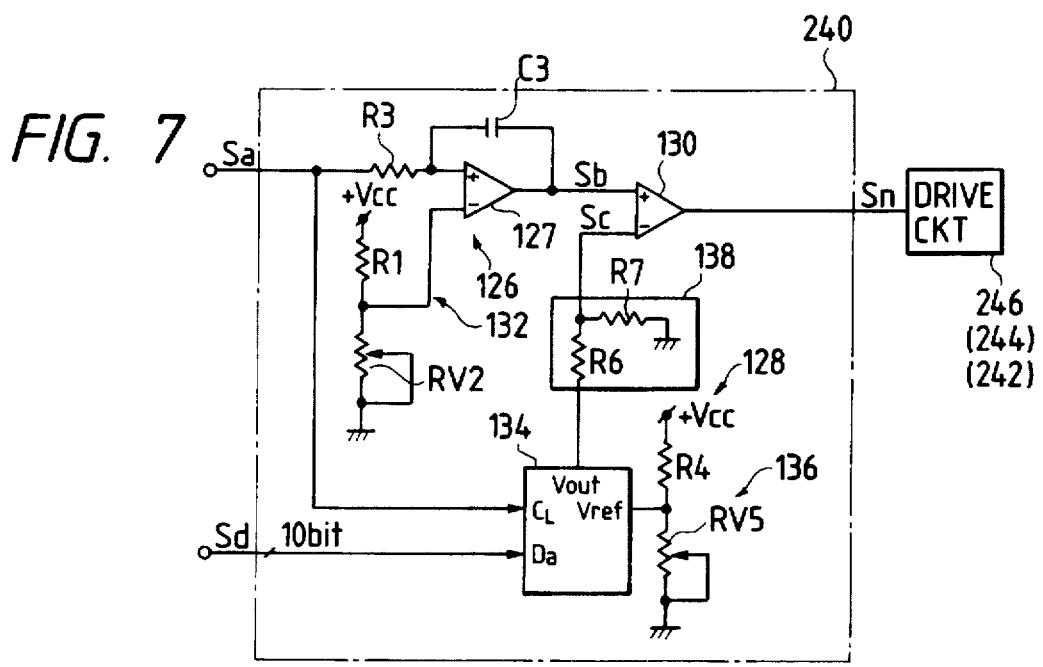
FIG. 7 is a block diagram for the circuit of an image signal processor.

FIG. 7 is a block diagram for the circuit of the image signal processor 240 shown in FIG. 3. As shown, the image signal processor 240 receives a pixel sync signal Sa and digital image data Sd and outputs a pulse width modulation control signal Sn to the semiconductor laser drive circuits 246, 244 and 242. The image signal processor 240 comprises a Miller integrator (triangular wave generator) 126 which receives a pixel sync signal Sa of square wave and outputs a triangular wave signal Sb, an image signal generator 128 which receives digital image data Sd and generates an image signal Sc, and a comparator 130 that receives both triangular wave signal Sb and image signal Sc and outputs a pulse width modulation control signal Sn.

Figures 8, 9:
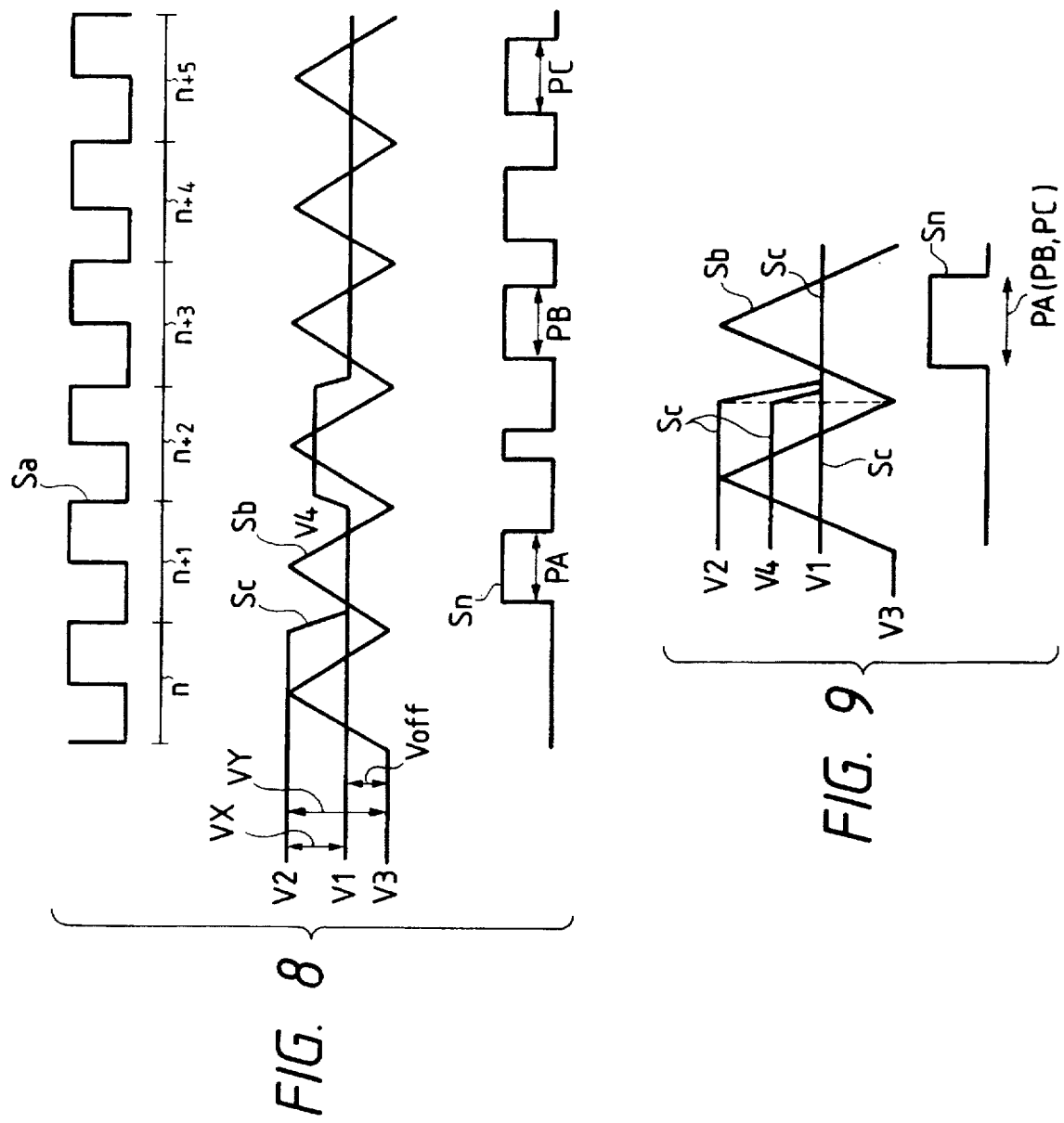
FIG. 8 is a timing chart showing the relationship between pixel signal Sa, triangular-wave signal Sb, image signal Sc and pulse width modulation control signal Sn.
FIG. 9 is a diagram showing the relationship between triangular-wave signal Sb, image signal Sc and pulse width modulation control signal Sn.

As shown in FIG. 8, the image signal Sc varies over the range of level VX between a first dc level V1 and a second dc level V2 that exceeds said first dc level V1, and the triangular wave signal Sb varies over the range of level VY between a third dc level V3, which is less than the first dc level V1, and the second dc level V2. The third dc level V3 to be applied to the triangular wave signal Sb can be varied by adjusting resistor RV2 which combines with another resistor R1 at an input to an operational amplifier 127 in the Miller integrator 126 to form a resistance divider 132. The slope of the triangular wave signal Sb can be determined by resistor R3 and capacitor C3. For determination of the first dc level V1 and the second dc level V2, see below.

The image signal generator 128 comprises a D/A converter 134, a resistance divider circuit 136 composed of resistors R4 and RV5 connected to the reference voltage input terminal $V_{ref}$ of the D/A converter 134, and a resistance divider circuit 138 composed of resistors R6 and R7 which are connected between the output terminal $V_{out}$ of the D/A converter 134 and an input terminal of the comparator 130. Therefore, the first dc level V1 and the second dc level V2 can be determined by varying either the value of resistor RV5 in the resistance divider 136 or the values of resistors R6 and R7 in the resistance divider circuit 138. The image signal generator 128 is so configured that 10-bit digital image data Sd is supplied at the data input terminal Da of the D/A converter 134.

The image signal processor 240 in accordance with the embodiment under discussion is operated in the following manner.

FIG. 8 is a timing chart illustrating by waveforms the operation of the image signal processor 240 shown in FIG. 7. Pixel sync signals Sa which are square-wave signals for image numbers n to n+5 (see FIG. 8) are supplied to both the Miller integrator 126 and the sync signal input terminal $C_L$ of D/A converter 134 in the image signal processor 240. The Miller integrator 126 integrates the supplied pixel sync signals Sa and produces triangular wave signals Sb whose dc level varies between the third dc level V3 and the second dc level V2 as shown in FIG. 8.

In synchronism with the pixel sync signals Sa, digital image data Sd is supplied to the D/A converter 134 in the image signal generator 128 and passes through the resistance divider circuit 138 to be converted to image signals Sc whose dc level varies between the first dc level V1 and the second dc level V2. In the case under discussion, image signals Sc can take on three dc levels, the first dc level V1, the second dc level V2 and a fourth dc level V4 which is between the first dc level V1 and the second dc level V2.

Being supplied with Sb and Sc, the comparator 130 will output pulse width modulation control signals Sn as shown in FIG. 8. In this case, a so-called "offset V off" is provided between the first dc level V1 of image signal Sc and the third dc level V3 of triangular wave signal Sb. Even if a signal delay occurs in the transition from image signal Sc with pixel number n to Sc with pixel number n+1 or from image signal with pixel number n+2 to Sc with pixel number n+3, the offset V off enables comparison between two signal levels after proper shaping of the waveform of image signal Sc. Hence, in response to image signals having the same value of the first dc level V1, the image signal processor 240 will output pulse width modulation control signals $S_n$ that have constant and invariable pulse width PA, PB and PC (see FIGS. 8 and 9).

In response to the 10-bit digital image data Sd, the pulse width modulation control signals $S_n$ vary at 1024 ($2^{10}$) levels between $S_O$ (the pulse width modulation control signal for achieving a maximum quantity of light) and $S_{1023}$ (the pulse width modulation control signal for achieving a minimum quantity of light). Such pulse width modulation control signals $S_n$ are supplied to the drive circuits 242, 244 and 246 each composed of a voltage-to-current converter, where they are converted to current signals sufficient to drive the semiconductor lasers 253, 252 and 251. Thus, the semiconductor lasers 253, 252 and 251 will illuminate the photographic material 20 with light that has been modulated in accordance with the supplied pulse width modulation control signals $S_n$, whereby an image is formed on the photographic material 20, in association with the input digital image data Sd.

The characteristic curve of the photographic material 20 which is subjected to digital exposure on the basis of the pulse width modulation control signals $S_n$ which have been processed with the above-described image signal processor 240 is such that in the area of light quantity ($E_{820}-E_{min}$) not higher than $E_{820}$ or the amount of exposure corresponding to the pulse width modulation control signal denoted by $S_{820}$ (n=820 in FIG. 1), with $S_0$ being written for the pulse width modulation control signal for achieving a maximum quantity of light $E_{max}$ and $S_{1023}$ being written for the pulse width modulation control signal for achieving a minimum quantity of light $E_{min}$, the curve passes below the upper reference line which, as shown in FIG. 1, connects three points A ($logE_{max}-1.55$, 0.15), B ($logE_{max}-1.10$, 0.35) and C ($logE_{max}-0.95$, 0.60). Since the slope of gamma of the photographic material is small in that region, the density difference $\Delta D_3$ due to the 1-bit change in the pulse width modulation control signal will not exceed the visibility limit as the density difference $\Delta D_2$ did in the prior art method and this contributes to the formation of an image of satisfactory gradation in the highlighted area.

The following examples are provided for the purpose of further illustrating the present invention but are in no way to be taken as limiting.

EXAMPLE 1

Preparation of emulsion(a)

Sodium chloride (3.3 g) was added to a 3% aqueous solution of lime-treated gelatin, followed by addition of 3.2 ml of N,N'-dimethylimidazolidine-2-thione (2% aq. sol.). To the resulting aqueous solution, an aqueous solution containing 0.2 mole of silver nitrate and an aqueous solution containing 0.2 mole of sodium chloride and 2 μg of rhodium trichloride were added under vigorous agitation at 60° C. Subsequently, an aqueous solution containing 0.79 mole of silver nitrate and an aqueous solution containing 0.7 mole of sodium chloride and 4.2 mg of potassium ferrocyanide were added with vigorous agitation at 60° C. Five minutes after the end of addition of the aqueous solution of silver nitrate and the aqueous solution of alkali halide, an aqueous solution containing fine silver bromide grains (particle size, 0.05 μm) in an amount equivalent to 0.01 mole as silver and an aqueous solution containing 0.8 mg of potassium hexachloroiridate (IV) were added with vigorous stirring at 50° C. Thereafter, a copolymer of a 1-sodium salt of isobutenemaleic acid was added to effect flocculation washing and, hence, desalting. Further, lime-treated gelatin was added in an amount of 90.0 g to adjust the emulsion pH and pAg to 6.2 and 6.5, respectively. Finally, a sulfur sensitizer (triethylthiourea), chloroauric acid and nucleic acid were added in respective amounts of $1 \times 10^{-5}$ mole/mole Ag, $1 \times 10^{-5}$ mole/mole Ag and 0.2 g/mole Ag, whereby optimum chemical sensitization was achieved at 50° C.

An electron micrograph was taken of the thus prepared silver chlorobromide grains in order to determine their shape, particle size distribution. All of those silver halide grains were found to be cubic, with a particle size of 0.55 μm and a coefficient of variation of 0.08. The particle size of the grains was expressed by the average diameter of an equivalent circle having the same area as the projected area of an individual grain, and the coefficient of variation was calculated by dividing the standard deviation of particle size by the average particle size.

Subsequently, an X-ray diffraction scan was taken of the silver halide crystals so as to determine the halide composition of the emulsion grains. With a monochromatic CuKα radiation used as a radiation source, angles of diffraction from a (200) face were measured exactly. Diffraction lines from crystals having a homogeneous halide composition provided a single peak but, on the other hand, diffraction lines from crystals having local phases of different compositions provided a plurality of peaks corresponding to the respective compositions. By computing lattice constants from the diffraction angles for the measured peaks, the halide compositions of the silver halides constituting the respective crystals can be determined. A measurement of the silver chlorobromide emulsion (a) gave a broad diffraction pattern which, aside from a dominant peak for 100% AgCl, had a center at 75% AgCl (25% AgBr) with a tail extending close to 60% AgCl (40% AgBr).

Preparation of emulsion (b)

Sodium chloride (3.3 g) was added to a 3% aqueous solution of lime-treated gelatin, followed by addition of 3.2 ml of N,N'-dimethylimidazolidine-2-thione (2% aq. sol.). To the resulting aqueous solution, an aqueous solution containing 0.2 mole of silver nitrate and an aqueous solution containing 0.2 mole of sodium chloride and 5 μg of rhodium trichloride were added under vigorous agitation at 50° C. Subsequently, an aqueous solution containing 0.79 mole of silver nitrate and an aqueous solution containing 0.7 mole of sodium chloride and 4.2 mg of potassium ferrocyanide were added with vigorous agitation at 50° C. Five minutes after the end of addition of the aqueous solution of silver nitrate and the aqueous solution of alkali halide, an aqueous solution containing fine silver bromide grains (particle size, 0.05 μm in an amount equivalent to 0.01 mole as silver and an aqueous solution containing 0.8 mg of potassium hexachloroiridate (IV) were added with vigorous stirring at 50° C. Thereafter, a copolymer of a 1-sodium salt of isobutenemaleic acid was added to effect flocculation washing and, hence, desalting. Further, lime-treated gelatin was added in an amount of 90.0 g to adjust the emulsion pH and pAg to 6.2 and 6.5, respectively. Finally, a sulfur sensitizer (triethylthiourea), chloroauric acid and nucleic acid were added in respective amounts of $1 \times 10^{-5}$ mole/mole Ag, $1 \times 10^{5}$ mole/mole Ag and 0.2 g/mole Ag, whereby optimum chemical sensitization was achieved at 50° C.

An electron micrograph was taken of the thus prepared silver chlorobromide determine their order to determine their shape, particle size distribution. All of those silver halide grains were found to be cubic, with a particle size of 0.43 μm and a coefficient of variation of 0.07. The particle size of the grains was expressed by the average diameter of an equivalent circle having the same area as the projected area of an individual grain, and the coefficient of variation was calculated by dividing the standard deviation of particle size by the average particle size.

Preparation of photographic material 1

The surface of a paper base laminated with polyethylene on both sides was subjected to a corona discharge treatment and, thereafter, a gelatin undercoat containing sodium dodecylbenzenesulfonate was provided. Further, various photographic constituent layers were coated to prepare a multi-layered color print paper having the layer arrangement described below. For the preparation of the coating solutions, also see below.

Preparation of the coating solution for the first layer

A yellow coupler (ExY, 19.1 g), a color image stabilizer (Cpd-1, 4.4 g) and another color image stabilizer (Cpd-7, 0.7 g) were dissolved in 27.2 cc of ethyl acetate and 4.1 g each of solvents (Solv-3 and Solv-7). The resulting solution was dispersed in 185 cc of a 10% aqueous gelatin solution containing 8 cc of 10% sodium dodecylbenzenesulfonate to prepare an emulsified dispersion. In a separate step, a red-sensitive sensitizing dye (see below under Dy-1) was added to the previously prepared silver chlorobromide emulsion (a). The resulting emulsion was mixed uniformly with the emulsified dispersion to prepare a coating solution that would provide the first layer having the composition to be described below.

Coating solutions for the second to the seventh layers were prepared by the same method as that for preparing the coating solution for the first layer. A sodium salt of 1-oxy-3,5-dichloro-s-triazine was used as a gelatin hardener in the respective layers.

In each layer, Cpd-10 and Cpd-11 were added in such amounts that the total contents would be 25.0 mg/m$^2$ (Cpd-10) and 50.0 mg/m$^2$ (Cpd-11).

The respective light-sensitive layers incorporated the following spectral sensitizing dyes.

(First layer: Red-sensitive yellow color forming layer)
(Dye-1)

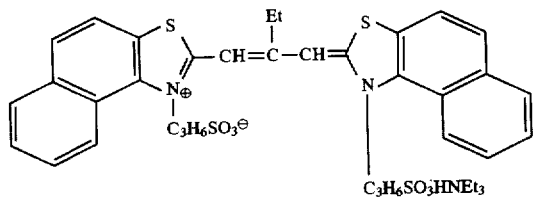

$1.0 \times 10^{-4}$ mol per mol of silver halide

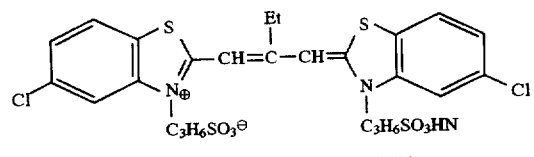

$1.0 \times 10^{-4}$ mol per mol of silver halide (Third layer: Infrared-sensitive magenta color forming layer)
(Dye-2)

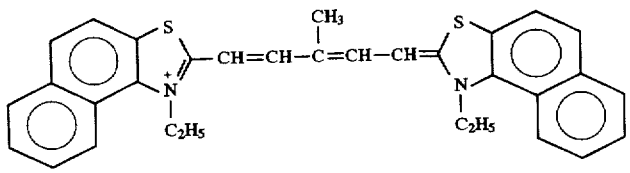

$4.5 \times 10^{-5}$ mol per mol of silver halide (Fifth layer: Infrared-sensitive cyan color forming layer)
(Dye-3)

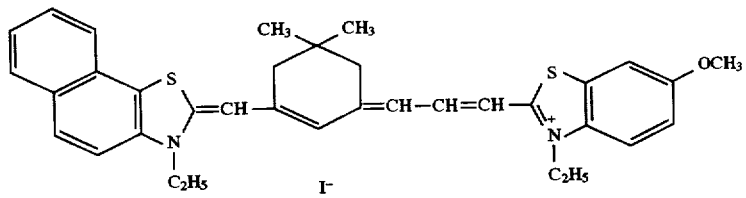

$0.5 \times 10^{-5}$ mol per mol of silver halide

When (Dye-2) and (Dye-3) wee used, the compound identified below was also added in an amount of $1.8 \times 10^{-3}$ mole per mole of silver halide.

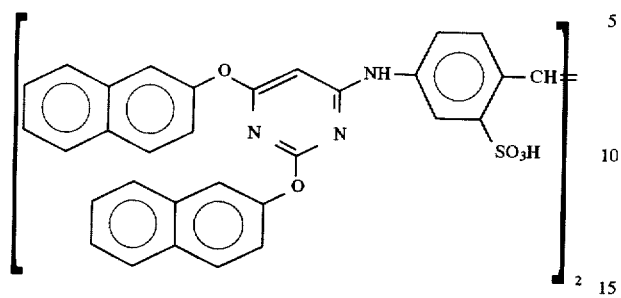

Each of the yellow-, magenta- and cyan-color forming emulsion layers had 1-(5-methylureidophenyl)-5-mercaptotetrazole added in an amount of $8.0 \times 10^{-4}$ moles per mole of silver halide.

The compounds identified below were further added to the emulsion layers for anti-irradiation purposes.

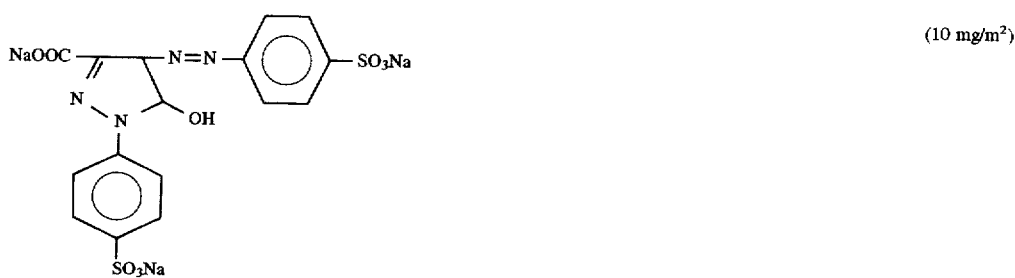

(10 mg/m$^2$)

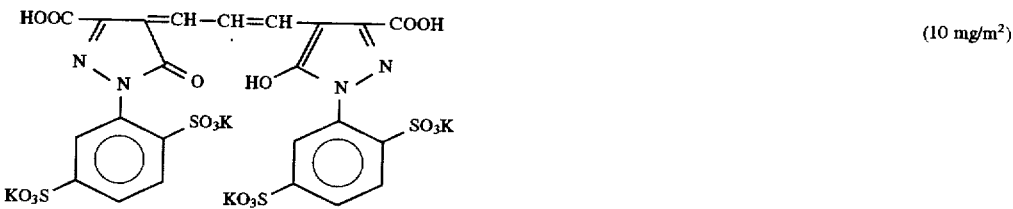

(10 mg/m$^2$)

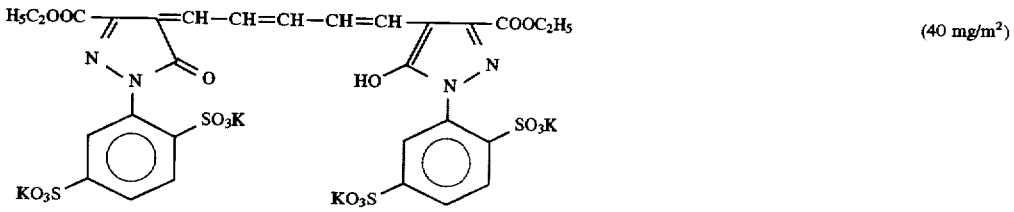

(40 mg/m$^2$)

and

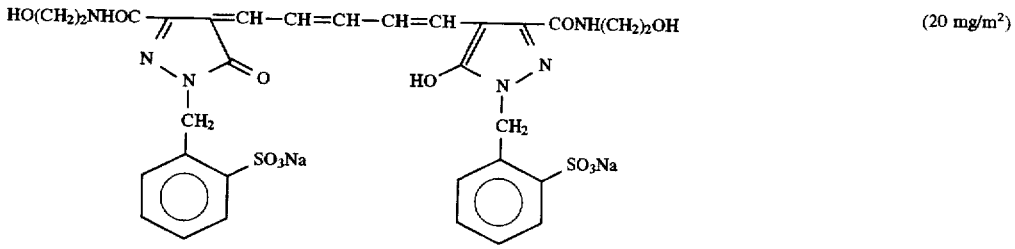

(20 mg/m$^2$)

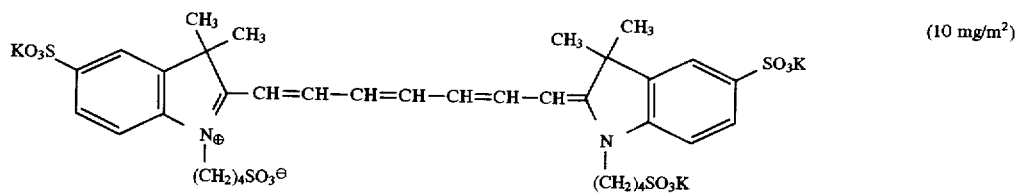

(10 mg/m$^2$)

and

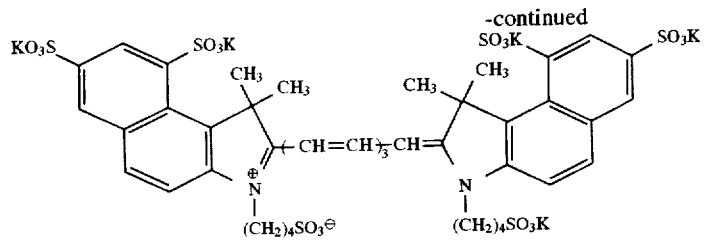
(5 mg/m²)

and

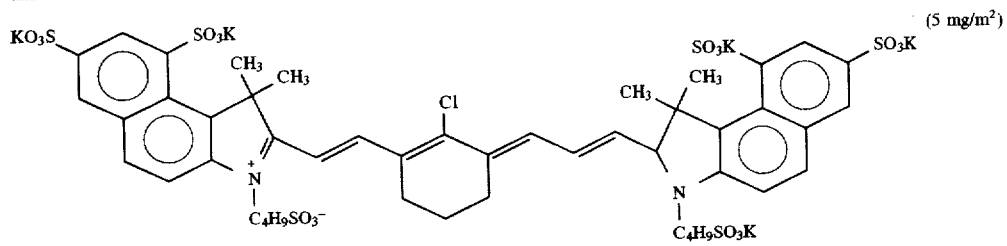
(5 mg/m²)

Layer arrangement

The composition of each layer is shown below, in which the numerals represent the coating weight (g/m²) except that the coating weights of silver halide emulsions are calculated for silver.

Base

Polyethylene laminated paper
[containing a white pigment (TiO₂) and a bluing dye (ultramarine) in the polyethylene coat adjacent the first layer]

| | |
|---|---|
| First layer (red-sensitive yellow color forming layer) | |
| AgClBr emulsion (a) | 0.30 |
| Gelatin | 1.86 |
| Yellow coupler (ExY) | 0.82 |
| Color image stabilizer (Cpd-1) | 0.19 |
| Solvent (Solv-3) | 0.18 |
| Solvent (Solv-7) | 0.18 |
| Color image stabilizer (Cpd-7) | 0.06 |
| Second layer (anti-color mixture layer) | |
| Gelatin | 0.99 |
| Anti-color mixture agent (Cpd-5) | 0.08 |
| Solvent (Solv-1) | 0.16 |
| Solvent (Solv-4) | 0.08 |
| Third layer (infrared-sensitive magenta color forming layer) | |
| AgClBr emulsion (a) | 0.12 |
| Gelatin | 1.24 |
| Magenta coupler (ExM) | 0.23 |
| Color image stabilizer (Cpd-2) | 0.03 |
| Color image stabilizer (Cpd-3) | 0.16 |
| Color image stabilizer (Cpd-4) | 0.02 |
| Color image stabilizer (Cpd-9) | 0.02 |
| Solvent (Solv-2) | 0.40 |
| Fourth layer (uv absorbing layer) | |
| Gelatin | 1.58 |
| UV absorber (UV-1) | 0.47 |
| Anti-color mixture agent (Cpd-5) | 0.05 |
| Solvent (Solv-5) | 0.24 |
| Fifth layer (infrared-sensitive cyan color forming layer) | |
| AgClBr emulsion (a) | 0.23 |
| Gelatin | 1.34 |
| Cyan coupler (ExC) | 0.32 |
| Color image stabilizer (Cpd-2) | 0.03 |
| Color image stabilizer (Cpd-4) | 0.02 |
| Color image stabilizer (Cpd-6) | 0.18 |
| Color image stabilizer (Cpd-7) | 0.40 |
| Color image stabilizer (Cpd-8) | 0.05 |
| Solvent (Solv-6) | 0.14 |

-continued

| Sixth layer (uv absorbing layer) | |
|---|---|
| Gelatin | 0.53 |
| UV absorber (UV-1) | 0.16 |
| Anti-color mixture agent (Cpd-5) | 0.02 |
| Solvent (Solv-5) | 0.08 |
| Seventh layer (protective layer) | |
| Gelatin | 1.20 |
| Acrylic modified copolymer of polyvinyl alcohol (17% modified) | 0.17 |
| Liquid paraffin | 0.03 |

(ExY) Yellow coupler

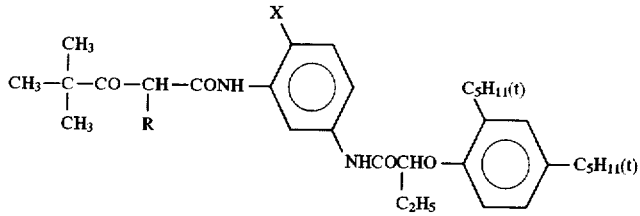

which is a 1:1 mixture (by molar ratio) of

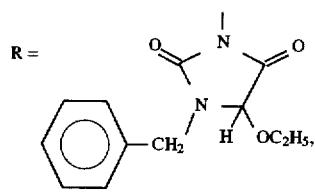

X = Cl and

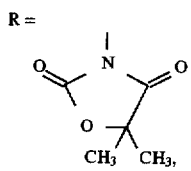

X = OCH₃

(ExM) Magenta coupler

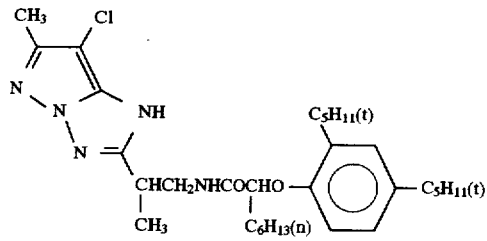

(ExC) Cyan coupler
1:1 Mixture (by molar ratio) of

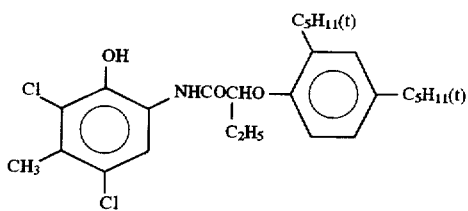

and

-continued
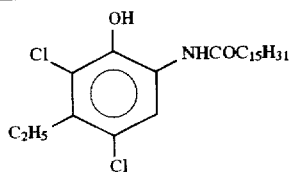
(Cpd-1) Color image stabilizer
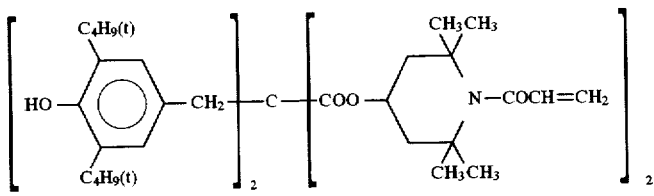
(Cpd-2) Color image stabilizer
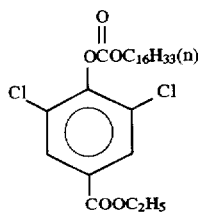
(Cpd-3) Color image stabilizer
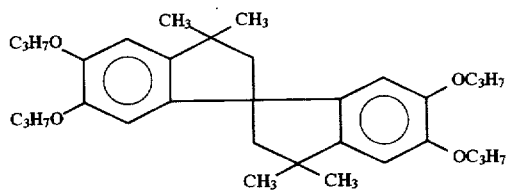
(Cpd-4) Color image stabilizer
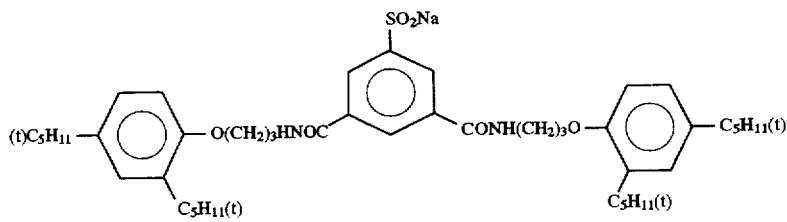
(Cpd-5) Anti-color mixture agent
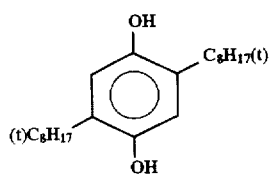
(Cpd-6) Color image stabilizer
2:4:4 Mixture (by weight ratio) of
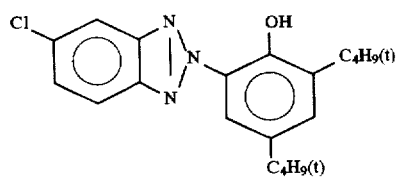

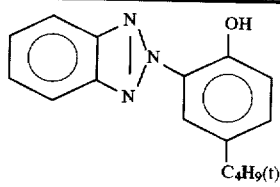
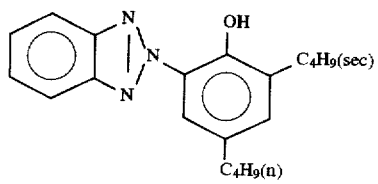
(Cpd-7) Color image stabilizer
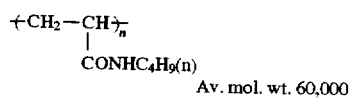
Av. mol. wt. 60,000
(Cpd-8) Color image stabilizer
1:1 Mixture (by weight ratio) of
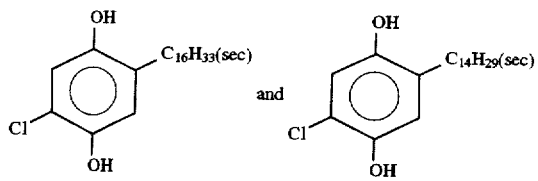
(Cpd-9) Color image stabilizer
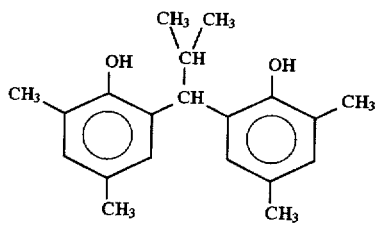
(Cpd-10) Antiseptic
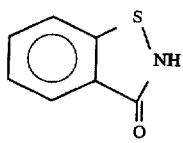
(Cpd-11) Antiseptic
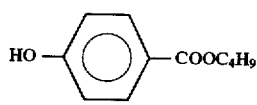
(UV-1) UV absorber
4:2:4 Mixture (by weight ratio) of
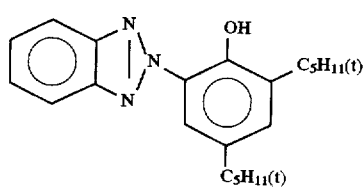

-continued
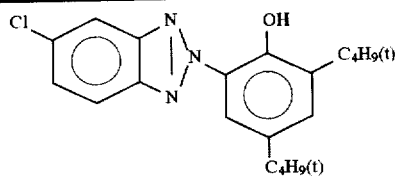
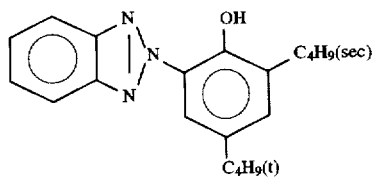
(Solv-1) Solvent
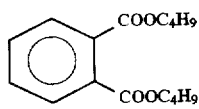
(Solv-2) Solvent
1:1 Mixture (by volume ratio) of
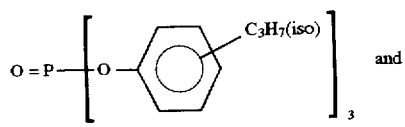
(Solv-3) Solvent
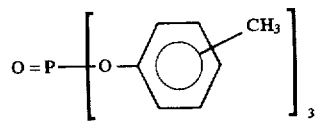
(Solv-4) Solvent
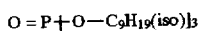
(Solv-5) Solvent
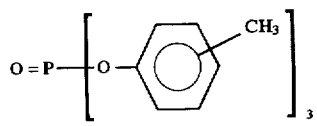
(Solv-6) Solvent
80:20 Mixture (by volume ratio) of
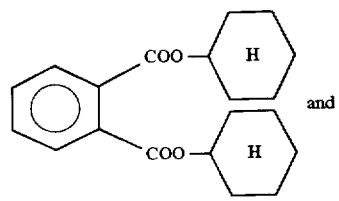
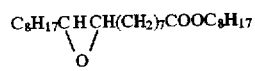
(Solv-7) Solvent -continued

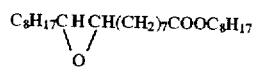

Preparation of photographic materials 2 and 3

Photographic materials 2 and 3 were prepared in accordance with the same formulation as photographic material 1 except that the silver halide emulsion used in the first layer (yellow color forming layer), the third layer (magenta color forming layer) and the fifth layer (cyan color forming layer) was changed to those shown Table 7. Stated briefly, emulsion (b) was used in photographic material 2 whereas a 2:8 blend of emulsions (a) and (b) was used in photographic material 3.

TABLE 7

| Photographic material | Emulsion used in Y layer | Emulsion used in M layer | Emulsion used in C layer | Remarks |
|---|---|---|---|---|
| 1 | (a) | (a) | (a) | comparison |
| 2 | (b) | (b) | (b) | comparison |
| 3 | (a) 20%<br>(b) 80% | (a) 20%<br>(b) 80% | (a) 20%<br>(b) 80% | invention |

The photographic materials thus prepared were exposed with an apparatus having the construction described below.

Exposure

Figure 4:
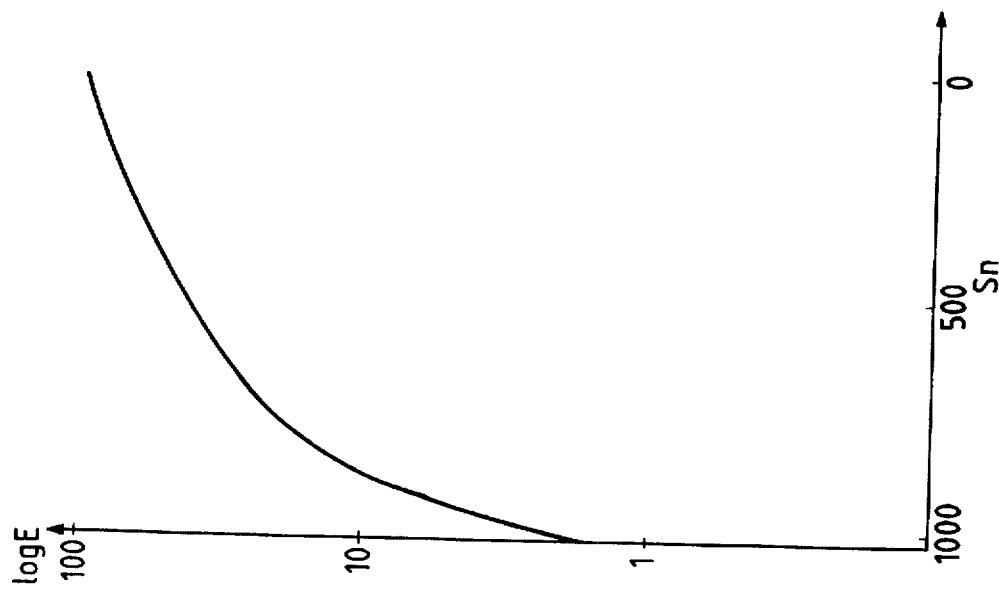
FIG. 4 is a graph showing the relationship between a modulation control signal and the quantity of light as observed in the examples of the present invention.
Figure 6:
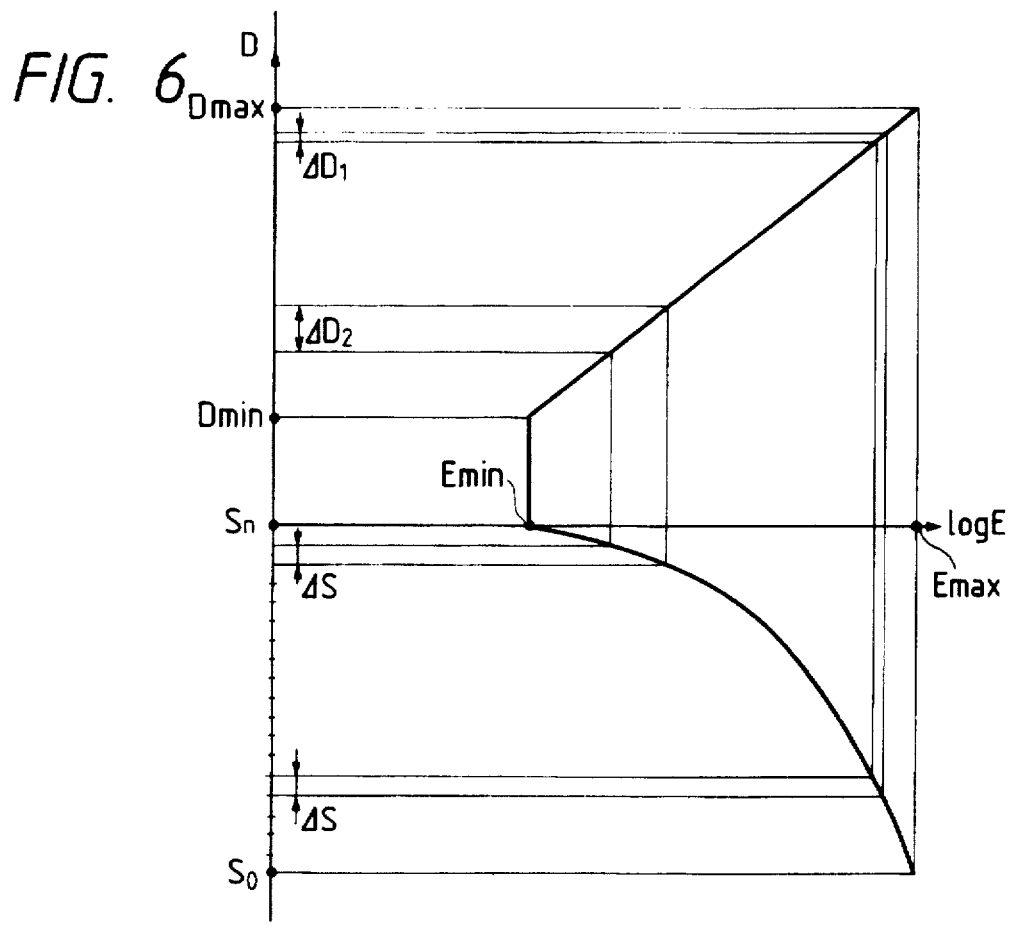
FIG. 6 is a graph showing the relationship between a modulation control signal, the quantity of light and image density as observed in the prior art.

The semiconductor lasers, AlGaInP (emission wavelength: ca. 670 nm) and GaAlAs (emission wavelength: ca. 830 nm), were used as light sources. The light from each layer was reflected by a polygonal mirror so that it could successively scan over the color photographic paper moving in a direction perpendicular to the fast scan direction. The amount of exposure was controlled by a pulse width modulation control method in which the quantity of light was modulated by varying the time of current application to the semiconductor lasers on the basis of image formation. This method enabled the amount of exposure to be varied at 1024 levels. If a maximum quantity of light ($E_{max}$) that can be attained by this modulation method is taken as 100, a minimum quantity of light ($E_{min}$) is 1.8 and the relationship between the modulation signal and the quantity of light provides a curve as shown in FIG. 4. For exposing photographic materials 1 to 3, an ND filter was used to make an adjustment to the density 2.2 (free from fog) as the maximum quantity of light from each laser.

The value assigned to n is $S_n$, or the modulation signal that will provide the density 0.5 by the above-described method of exposure, is 820 and the amount of modulated light associated with this signal $S_{820}$ is 15.8 (when $E_{max}$=100).

Photographic materials 1 to 3 were subjected to multi-level exposure by varying the amount of exposure with the apparatus described above, and they were subsequently processed photographically in the manner described below. The resulting relationship between density and the logarithm of exposure is shown as a D vs logE curve in FIG. 5.

In the next place, digital image information was read from a color reversal film by means of a printing scanner and on the basis of that information, photographic materials 1 to 3 were exposed with the apparatus described in the preceding paragraphs. For this exposure step, a lookup table was constructed from the characteristic curves for the respective photographic materials and the apparatus was set in such a way as to produce comparable prints on the three photographic materials. After exposure, the photographic materials were processed photographically in the manner described below.

Photographic processing

The exposed samples were fed into a paper processor and subjected to continuous (running) processing through the steps shown below until the amount of replenishment doubled the capacity of the color developing tank.

| Steps | Temperature (°C.) | Time (sec) | Replenisher* (ml) | Tank capacity (L) |
|---|---|---|---|---|
| Color development | 35 | 45 | 161 | 17 |
| Bleach fixing | 30–35 | 45 | 215 | 17 |
| Rinsing (1) | 30–35 | 20 | — | 10 |
| Rinsing (2) | 30–35 | 20 | — | 10 |
| Rinsing (3) | 30–35 | 20 | 315 | 10 |
| Drying | 70–80 | 60 | | |

*The amount of replenisher is per square meter of photographic material.

The rinse solution was replenished by a three-tank countercurrent method in which the replenisher was permitted to flow countercurrently from rinse tank (3) through tank (2) to tank (1).

The processing solutions had the following formulations.

| Color developing solution | Tank Solution | Replenisher |
|---|---|---|
| Water | 800 ml | 800 ml |
| Ethylenediamine-N,N,N,N-tetramethylenephosphonic acid | 1.5 g | 2.0 g |
| Potassium bromide | 0.015 g | — |
| Triethanolamine | 8.0 g | 12.0 g |
| Sodium chloride | 1.4 g | — |
| Potassium carbonate | 25 g | 25 g |
| N-Ethyl-N-(β-methanesulfon-amidoethyl)-3-methyl-4-amino-aniline sulfate | 5.0 g | 7.0 g |
| N,N-Bis(carboxymethyl)hydrazine | 4.0 g | 5.0 g |
| N,N-Di(sulfoethyl)hydroxylamine 1Na | 4.0 g | 5.0 g |
| Optical brightening agent (WHITEX 4B of Sumitomo Chemical Co., Ltd.) | 1.0 g | 2.0 g |
| water to make | 1000 ml | 1000 ml |
| pH (25° C.) | 10.05 | 10.45 |

Bleach-fixing solution (tank solution and replenisher are the same as each other)

| | |
|---|---|
| Water | 400 ml |
| Ammonium thiosulfate (700 g/L) | 100 ml |
| Sodium sulfite | 17 g |
| Ethylenediaminetetraacetic acid iron (III) ammonium | 55 g |
| Ethylenediaminetetraacetic acid disodium | 5 g |
| Ammonium bromide | 40 g |
| Water to make | 1000 ml |
| pH (25° C.) | 6.0 |

Rinsing solution
(tank solution and replenisher are the same as each other)
Ion-exchanged water (Ca, Mg≦3 ppm)

The sample prepared from photographic material 2 had a low maximum density and the image quality was obviously poor.

The samples prepared from photographic samples 1 and 3 were almost comparable in terms of average image density, gradation and color reproduction. When those two samples were evaluated by 10 persons, 8 of them rated the sample of photographic material 3 better than the sample of photographic material 1. The reason was that the image obtained with photographic material 1 had unnatural density skips and false edges of contour in the highlighted area. These results show that by performing digital expose on photographic materials in accordance with the present invention, image can be obtained that has fewer density skips and false edges of contour in the low-density area.

EXAMPLE 2

Another set of photographic materials 1 to 3 prepared in Example 1 were subjected to digital imagewise exposure in the same manner as in Example 1 and they were then processed by color photography with a paper processor in accordance with the scheme described below. The samples thus obtained were evaluated by the same method as in Example 1. The results were also the same as obtained in Example 1.

| Steps | Temperature (°C.) | Time (sec) | Replenisher* (ml) | Tank capacity (L) |
|---|---|---|---|---|
| Color development | 35 | 20 | 60 | 2 |
| Bleach-fixing | 30–35 | 20 | 60 | 2 |
| Rinsing (1) | 30–35 | 10 | — | 1 |
| Rinsing (2) | 30–35 | 10 | — | 1 |
| Rinsing (3) | 30–35 | 10 | 120 | 1 |
| Drying | 70–80 | 20 | | |

*The amount of replenishment is per square meter of photographic material.

The rinse solution was replenished by a three-tank countercurrent method in which the replenisher was permitted to flow countercurrently from rinse tank (3) through tank (2) to tank (1).

The processing solutions had the following compositions.

| Color developing solution | Tank Solution | Replenisher |
|---|---|---|
| Water | 800 ml | 800 ml |
| Ethylenediamine-N,N,N,N-tetramethylenephosphonic acid | 1.5 g | 2.0 g |
| Potassium bromide | 0.015 g | — |

-continued

| | | |
|---|---|---|
| Triethanolamine | 8.0 g | 12.0 g |
| Sodium chloride | 4.9 g | — |
| Potassium carbonate | 25 g | 37 g |
| 4-amino-3-methyl-N-ethyl-N-(3-hydroxypropyl)aniline 2 p-toluenesulfonic acid | 12.8 g | 19.8 g |
| N,N-Bis(carboxymethyl)-hydrazine | 5.5 g | 7.0 g |
| Optical brightening agent (WHITEX 4B of Sumitomo Chemical Co., Ltd.) | 1.0 g | 2.0 g |
| water to make | 1000 ml | 1000 ml |
| pH (25° C.) | 10.05 | 10.45 |

Bleach-fixing solution (tank solution and replenisher are the same as each other)

| | |
|---|---|
| Water | 400 ml |
| Ammonium thiosulfate (700 g/L) | 100 ml |
| Sodium sulfite | 17 g |
| Ethylenediaminetetraacetic acid iron (III) ammonium | 55 g |
| Ethylenediaminetetraacetic acid disodium | 5 g |
| Ammonium bromide | 40 g |
| Water to make | 1000 ml |
| pH (25° C.) | 6.0 |

Rinsing solution (tank solution and replenisher are the same as each other)

Ion-exchanged water (Ca, Mg $\leq$ 3 ppm)

EXAMPLE 3

Photographic materials were prepared as in Example 1 except that the infrared-sensitive sensitizing dye (Dye-3) used in AgClBr emulsion (a) was replaced by the compound shown below:

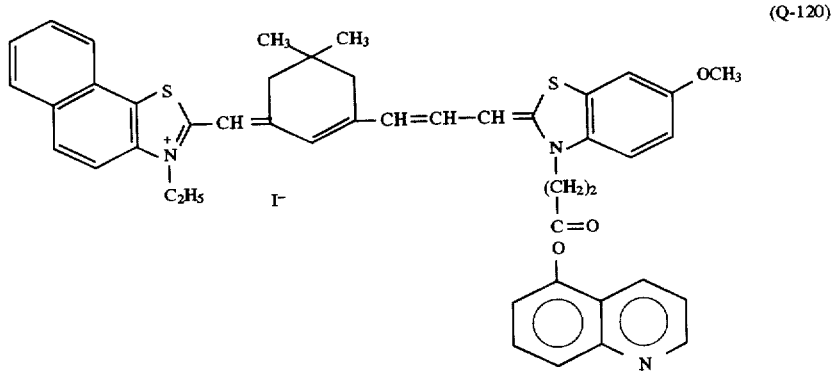

(Q-120)

The thus prepared photographic materials were subjected to digital exposure with the same apparatus as used in Example 1 and the results were the same as those obtained in Example 1.

In a certain case of digital exposure, the quantity of light varies antilogarithmically in response to modulation control signals applied to a light source such as laser light and the logarithm of the light quantity varies by a great amount in the highlighted area. In accordance with the present invention, digital exposure is performed on such light-sensitive materials that their characteristic curve passes below the line connecting the following three points, A ($logE_{max}-1.55$, fog+0.05), B ($logE_{max}-1.10$, fog+0.25) and C ($logE_{max}-0.95$, fog+0.50) and passes above point P ($logE_{max}$, fog+1.70). Therefore, even in digital exposure of the type described above, only a small change occurs in density in response to the change in the logarithm of the quantity of light. As a result, none of the density differences in the highlighted area will exceed the visibility limit and an image of good gradation can be formed without density skips or false edges of contour.

What is claimed is:

1. An image forming method characterized in that a silver halide photographic material whose density vs light quantity characteristic curve as obtained by photographic processing after exposure passes below the line connecting three points A ($logE_{max}-1.55$, fog+0.05), B ($logE_{max}-1.10$, fog+0.25) and C ($logE_{max}-0.95$, fog+0.50) on a coordinate system ($E_{max}$ is the maximum quantity of light to be controlled and is the lowest exposure that will provide a density of 2.2 (free from fog)) and passes above point P ($logE_{max}$, fog+1.70) corresponding to the density (fog+1.70) at maximum quantity of light beam is exposed by scanning for a time period of no more than $10^{-6}$ sec per pixel with a light beam the quantity of which is varied stepwise in response to a modulation control signal corresponding to image density and is thereafter processed photographically to form an image;

wherein said silver halide photographic material contains at least one silver halide emulsion layer which contains a silver halide emulsion having polyvalent metal ion impurities incorporated therein, said emulsion comprising a blend of a plurality of monodisperse emulsions having different sensitivities; and wherein said density vs light quantity characteristic curve is obtained by executing a gradation exposure by changing exposure amount and by applying the following processing steps:

| Processing Steps | Temperature (°C.) | Time (Sec) |
| --- | --- | --- |
| Color Development | 35 | 45 |
| Bleach Fixing | 30–35 | 45 |
| Rinsing (1) | 30–35 | 20 |

-continued

| Processing Steps | Temperature (°C.) | Time (Sec) |
| --- | --- | --- |
| Rinsing (2) | 30–35 | 20 |
| Rinsing (3) | 30–35 | 20 |
| Drying | 70–80 | 60 |

2. An image forming method according to claim 1 wherein said quantity of said light beam is obtained by time duration modulation control.

3. An image forming method according to claim 2 wherein said light beam is obtained by driving a laser.

4. An image forming method according to claim 3 wherein said characteristic curve of said photographic material has a gamma of no more than 3.5 in the process of said curve passing below said point C to ascend above said point P.

5. An image forming method according to claim 4 wherein said silver halide photographic material is a negative-acting light-sensitive material.

6. An image forming method according to claim 5 wherein said photographic processing after exposure is such that the time of color development is no more than 20 seconds and that the total processing time from the start of color development until the end of drying is no more than 90 seconds.

7. An image forming method according to claim 1 wherein said quantity of said light beam varies over the range of at least 1.6 on the logarithmic scale.

8. An image forming method according to claim 7 wherein said characteristic curve of said silver halide photographic material passes above the line connecting the following three points on the same coordinate system: a ($logE_{max}-0.3$, fog+0.05), b ($logE_{max}-0.2$, fog+0.7) and c ($logE_{max}-0.1$, fog+1.4).

9. An image forming method according to claim 1 wherein said quantity of said light beam varies over the range of at least 1.9 on the logarithmic scale.

10. An image forming method according to claim 1 wherein said silver halide photographic material has a silver chloride content of at least 90 mol %.

* * * * *